(12) United States Patent
Spielberg et al.

(10) Patent No.: US 7,366,979 B2
(45) Date of Patent: Apr. 29, 2008

(54) METHOD AND APPARATUS FOR ANNOTATING A DOCUMENT

(75) Inventors: Steven Spielberg, Los Angeles, CA (US); Samuel Gustman, Universal City, CA (US)

(73) Assignee: Copernicus Investments, LLC, Los Angeles, CA (US)

( * ) Notice: Subject to any disclaimer, the term of this patent is extended or adjusted under 35 U.S.C. 154(b) by 663 days.

(21) Appl. No.: 09/802,395

(22) Filed: Mar. 9, 2001

(65) Prior Publication Data

US 2002/0129057 A1    Sep. 12, 2002

(51) Int. Cl.
*G06F 15/00* (2006.01)

(52) U.S. Cl. .................. 715/512; 715/512; 715/799; 348/231.99

(58) Field of Classification Search .............. 715/512, 715/500.1, 727, 728, 729; 709/206; 345/473; 707/102; 379/88.13, 88.14; 235/375; 704/246, 704/260, 235, 270.1, 271
See application file for complete search history.

(56) References Cited

U.S. PATENT DOCUMENTS

| | | | | |
|---|---|---|---|---|
| 4,430,726 A | * | 2/1984 | Kasday | .................... 379/88.13 |
| 4,627,001 A | | 12/1986 | Stapleford et al. | |
| 5,309,359 A | * | 5/1994 | Katz et al. | .................. 707/102 |
| 5,404,295 A | * | 4/1995 | Katz et al. | .................. 715/512 |
| 5,477,451 A | | 12/1995 | Brown et al. | |
| 5,481,645 A | | 1/1996 | Bertino et al. | |
| 5,500,919 A | | 3/1996 | Luther | |
| 5,661,291 A | | 8/1997 | Ahearn et al. | |
| 5,721,827 A | | 2/1998 | Logan et al. | |
| 5,732,216 A | * | 3/1998 | Logan et al. | ............... 709/203 |
| 5,737,395 A | | 4/1998 | Irribarren | |
| 5,737,725 A | | 4/1998 | Case | |
| 5,787,231 A | | 7/1998 | Johnson et al. | |
| 5,841,979 A | | 11/1998 | Schulhof et al. | |
| 5,850,629 A | | 12/1998 | Holm et al. | |

(Continued)

OTHER PUBLICATIONS

Adobe Creative Team Adobe Acrobat 4.0 Classroom in a Book, Second Edition, Section "A Quick Tour of Adobe Acrobat" (Adobe Press, ©Jan. 3, 2003).*

(Continued)

*Primary Examiner*—Doug Hutton
*Assistant Examiner*—Tran A. Quoc
(74) *Attorney, Agent, or Firm*—The Hecker Law Group, PLC

(57) ABSTRACT

An apparatus for annotating a document is presented. The invention allows the addition of verbal annotations to a digital document such as a movie script, book, or any other type of document. In an embodiment, the invention the stores audio comments in data storage as an annotation linked to a location in the document being annotated. The invention may be implemented in a variety of smart mobile devices, including automotive entertainment systems, cell phones, and other portable computing devices.

14 Claims, 14 Drawing Sheets

U.S. PATENT DOCUMENTS

| | | |
|---|---|---|
| 5,875,448 A | 2/1999 | Boys et al. |
| 5,884,262 A | 3/1999 | Wise et al. |
| 5,884,266 A | 3/1999 | Dvorak |
| 5,899,975 A | 5/1999 | Nielsen |
| 5,915,001 A | 6/1999 | Uppaluru |
| 5,915,238 A | 6/1999 | Tjaden |
| 5,924,068 A | 7/1999 | Richard et al. |
| 6,167,376 A | 12/2000 | Ditzik |
| 6,181,351 B1* | 1/2001 | Merrill et al. ............. 345/473 |
| 6,321,198 B1 | 11/2001 | Hank et al. |
| 6,507,643 B1* | 1/2003 | Groner ...................... 709/206 |
| 6,616,038 B1* | 9/2003 | Olschafskie et al. ........ 235/375 |
| 2003/0196164 A1* | 10/2003 | Gupta et al. ................ 715/512 |

OTHER PUBLICATIONS

Jennifer, Alspach, PDF with Acrobat 5: Visual Quickstart Guide, Chapter 10—"Annotating PDFs" (Peachpit Press, ©Aug. 31, 2001).*

Giordan, Daniel, How to Use Adobe Photoshop 7, Part 2—"Optimizing Photoshop Projects" (Sams Publishing, ©Apr. 24 2002).*

* cited by examiner

METHOD AND APPARATUS FOR ANNOTATING A DOCUMENT

FIELD OF THE INVENTION

This invention relates to the field of computer technology. More specifically, the invention relates to a method and apparatus for performing document annotation.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyrights whatsoever.

BACKGROUND

Writing a screenplay, a book, or any other document is a process that usually requires a significant time investment from the people responsible for producing such a document. The quality and value of the document that is ultimately generated typically increases when multiple people have had the opportunity to review and comment on the document. As a result, the process of reviewing documents is tightly integrated into many aspects of modern business.

The first draft of a document often contains mistakes or other problems that should be corrected. These issues are typically resolved during the review process. Anybody that can provide valuable input about the document may contribute to the review process. During this process, the reviewer may, for example, wish to provide input about the contents of the document by giving comments, feedback, and/or making changes to the text of the document. In some instances entire portions of the document are deleted or rewritten. In other instances, portions of the document are simply critiqued. The document that is ultimately produced when the review process is complete may be very different from the document that existed in first draft form. Thus, the review process is a valuable step in the process of finalizing a document.

Since the people who are largely responsible for reviewing documents often have a schedule that keeps them moving from one meeting to another, there is a need for a device that simplifies the review process by allowing a reviewer to interact with the document while on the move. For example, current systems do not allow the reviewer to access and verbally comment on a document from multiple locations. A reviewer cannot use current systems to begin reviewing a document from a cell phone in the reviewer's car, continue to review the same document from a home PC, and finish reviewing the document from a pay phone.

Current systems also do not provide the reviewer with an intuitive way to verbally interact with the document. Most systems for reviewing documents are text-based and do not have the ability to read the document to the reviewer so that the reviewer can hear the contents of the document. Moreover, these text-based systems do not provide a way to record verbal comments provided by the reviewer while the document is being read. These limitations become particularly evident when the document being reviewed is a movie script or some other kind of document where it is important for the reviewer to hear the words contained in the document.

So that the reader can better understand the advances in the art made by embodiments of the invention, a brief discussion of several current systems for editing and/or commenting about a document follows. Some text-based systems (e.g., word processors) provide a way for reviewers to comment on a document by manually typing an entry into a comment field. Comments can also be recorded in a sound file and manually associated with the document. However, this process is laborious and does not provide the reviewer with a way to easily hear and comment upon a document.

Some word processing programs (e.g., Microsoft Word™) have a built in mechanism for inserting comments into a document. This mechanism does not provide reviewers with a way to listen to audio output associated with the contents of a text document. Nor do such programs allow the reviewer to provide input about the document by speaking to the word processing program. However, such word processing programs do supply reviewers with a way to manually insert typed comments into a text document.

FIG. 1 illustrates a word processing program configured to insert comments into a document. Word processing program 100 contains an instance of document 112 containing text about which the user of the program may comment. If the user wishes to comment on sentence 104, the user may insert comments into the document by utilizing a pointing device (e.g., a mouse) to highlight the text that is to be associated with the comment. Once the text is selected the user inputs the comments via an input device such as a computer keyboard. The comments are typically entered in a comment region 102 that consists of a list of one or more comments associated with document 112.

The user who authored the comment is identified in an abbreviated manner in a location related to the comment. User ID 110, for example, indicates that a user having a username (e.g.,user1: jake_smyth) is associated with comment 108. Comment 108 may exist as a textual comment or as an audio file. If a verbal comment was recorded and associated with document 112, the user may elect to listen to the verbal comment by selecting icon 106. Upon selection of icon 106, audio player 112 plays the audio file containing the stored version of the verbal comment. In some word processing programs, the text that is related to comment 104 is highlighted with a color that indicates a comment was made about that portion of text.

Although word processing programs provide a built-in mechanism for typing comments into a document such programs do not provide a way to insert comments into the document from a place other than the program itself. For example, a user cannot comment about the document unless the user is utilizing the word processing program and has a copy of the document on-hand. Thus, there is a need for a method and apparatus that complements existing word processing programs by providing users with alternative avenues for editing or commenting on a document while on the move. Moreover, such word processing program lack an efficient way to store and easily retrieve documents from any location once annotations are made to the document. For example, existing systems do not have a way to that allows the user to continuously access and make comments to the document.

Another example, of an existing system for editing documents can be found in Boys, et al. (U.S. Pat. No. 5,875,448). The Boys, et al. patent describes an audio editor that operates on a file that may contain text and voice data in separate regions. The audio editor described in Boys et al., provides functions for entering voice data, and also for editing the entered voice data. Once such voice data is entered and edited that data is passed to an individual for conversion into a text file. Files can be uploaded from the audio editor to a PC application for converting the file entirely to text, providing a system wherein all variable entry and editing can be done verbally, and conversion to text is left as a final chore.

FIG. 2 illustrates a representation of a data file as used in the audio editor described in Boys. et al. Data file 200 is created by the audio editor or some other digital device and downloaded to the audio editor. The file typically consists of digitally recorded voice data entered via a microphone or some other audio input. However, in some instances the data file supplied to the audio editor may have machine operable text code, as in a PC word processor file, and other portions that are digitally recorded voice. The dual nature of the data file is important because the final desirable form of a file is machine-readable code (e.g., a finished word-processor document). Thus, the nature of data file 200 is a formatted word processor file having sections wherein data may be added and edited as digitally recorded voice. This formatted file 200 contains sections such as headers, footers, subheads, (e.g., elements 202, 204, 206, 208, 210, 212, and 213) that cannot be edited by the audio editor because they are machine operable-text code. Boys, et al. does contemplate the use of text-reading software to render elements 202, 204, 206, 208, 210, and 212 as synthetic speech. The text-reading software provides users with a way to review all parts of the file 200, but the user "may only enter, add to, and edit the digitally-recorded audio portions" (See Boys, et al. Column 9, lines 4-5). In between elements 202, 204, 206, 208, 210, and 212 file 200 contains portions 59, 61, 63, 65, 67, and 69. These portions are reserved for digitally recorded voice. Thus, file 200 may contain both text portions (referred to as machine-operable text code) and digitally recorded audio portions. When the user selects a play button both the text portion and the audio portion are vocalized. The user may then forward or rewind the file to hear different portions vocalized. Thus, the audio editor provides users a way to create and edit a file before converting the file entirely to machine-operable code (e.g., text).

Once the user has finished creating the file it may be uploaded to a host computer such as a PC and converted into text. An operator does the final conversion using a word processing application. The word processing application displays file 200 in a manner that shows the text and vocal portions of the file. The operator may listen to the vocalized portions by selecting such portions with a mouse or other pointing device. The operator may then enter the vocalized data as text as it is recited.

There are multiple problems associated with the approach utilized in the Boys et al. reference. Boys et al., for example, does not provide a mechanism for verbally editing all aspects of the file (e.g., elements 200-213) cannot be edited. Boys et al. discloses a mechanism for editing the audio portions of file 200, but does not provide a way for the user to edit or comment on text elements in the file. Boys et al. is directed to creating and subsequently editing audio files that are inserted into a template file containing elements that cannot be edited. Thus, Boys et al. limits the operations of the user by restricting the elements that can be edited. Moreover, Boys et al. does not distinguish between vocalized input that is intended to be a comment or annotations. Rather Boys, et al. provides a way to add or makes changes to a document, but the user cannot flag certain portions of input as general comments. Another limitation inherent in the design utilized in Boys et al. is that the audio portions of the file must be manually converted into text via an operator. Boys et al. does not have a mechanism in place for automatically converting or aiding the user in the editing process. Boys et al. also lacks a mechanism for selectively listening to comments made by a particular user. In Boys et al., if two people edit the same document, the system does not distinguish between the parties and provide users a way to selectively listen to the comments of one party or another. Rather, the audio editor is intended to aid a single user in the creation and editing of a single file. The audio editor is used to generate documents not comment on an existing document without necessarily modifying the contents of the document itself. A further limitation in current systems is that such system are not directed to providing documents to users in any location. Users of the audio editor described in Boys et al. cannot, for example, obtain a document from a remote location without having an instance of the document on-hand.

Thus, there is a need for a system that solve the limitations inherent in the prior art by allowing the user to listen to a document and verbally comment on the contents of the document without necessarily changing the document. Moreover users could benefit from a system that aids the user responsible (e.g., the typist or data entry person) for the conversion process. In some instances there is also a need for a system that allows user to selectively listen to comments made by a certain individual without having to review all comments that were made about the document.

In the foregoing discussion about current systems, the problems and limitations set forth as existent in the prior art are provided for exemplarily purposes. It should be clear to one of ordinary skill in the art that these problems also exist in other contexts or professions and that the invention may apply to situations other than the ones described herein.

SUMMARY OF THE INVENTION

An embodiment of the invention describes a system that enables people to add verbal annotations (i.e. add comments) to a digital document such as a movie script, book, or any other type of document. This device provides the reviewer with an improved way to interact and comment upon documents while on the move. For example, the reviewer may utilize an embodiment of the invention to access and verbally comment on a document from multiple locations. Thus, the invention provides a system that enables the reviewer to begin reviewing a document from a cell phone, continue to review the same document from a home PC, and finish reviewing the document from a pay phone. An embodiment of the invention also provides the reviewer with an intuitive way to verbally interact with documents. The system can read documents (e.g., via a text-to-speech engine) so that the reviewer can hear the contents of the document. The system also provides the reviewer with a way to record verbal comments about the document. When a comment is supplied the comment becomes associated with the location in the document where the comment was provided. If, for example, the reviewer makes a comment about a particular passage of text, the comment becomes associated with the passage of text the comment is related to.

The device that embodies the invention uses an audio output mechanism to play the document to the user. At any time during playback the user may provide a comment by selecting an annotate button and simply speaking to the device. In turn, the device records the user's comment and associates it with the location in the document where the comment was given. If the document is replayed after a user provides comments, the device plays back the document and the comments via the audio output mechanism. This way the user can hear the document and any comments that were made about the document.

Some examples of the type of devices that can be configured to implement embodiments of the invention include, the components of an automobile sound system, a cell phone, a regular telephone, a personal computer, or any other computational system. Each of the devices that embody the invention may access the document (e.g., via a data storage medium or computer network) so as to provide the user with a way to review documents from multiple locations using multiple types of devices. The user may, for example, begin reviewing a document in an automobile, continue to review the document via a cell phone, and finish reviewing the document from home using a regular phone line.

One or more embodiments of the invention comprises a method and apparatus that enables users to add any number of annotations (i.e. add comments) to a digital document such as movie scripts, books, etc. from anywhere in the world. Thus, an embodiment of the invention enables users to hear and comment on a document from one or more locations. Any type of computational device may be configured to embody the invention and thereby provide the user with an interface to comment on or review comments about a particular document. Some examples of the type of devices that can be configured to implement embodiments of the invention include, the components of an automobile sound system, a cell phone, a regular telephone (e.g., POTS), a personal computer (e.g., a PC or a PDA), or any other system capable of accepting audio input and output. Each of the devices that embody the invention may access the document so as to provide the user with a way to review documents from multiple locations using multiple types of devices. The user may, for example, begin reviewing a document in an automobile, continue to review the document via a cell phone, and finish reviewing the document from home using a regular phone line.

Multiple types of devices can be modified to incorporate aspects of the invention. For example, an annotation device (e.g., an apparatus) having a processor and memory containing a text document may be coupled with a document processing engine that is configured to obtain the text document from memory and convert a portion of the document to an audio file that can be played to a user. If a user indicates a desire to hear the content of a document the annotation device uses an audio output mechanism to play the audio file to the user. If the user provides a comment to the annotation device an audio input device configured to obtain such verbalized comments from the user stores the comment as an audio comment file. The annotation device passes the audio comment file to an annotator that is configured to associate the audio comment file with a location in the text document that corresponds to the audio file playing when the first user provided the verbalized comment.

Another embodiment of the invention comprises an apparatus that utilizes a set of components distributed across a network. In this embodiment a server that has a text-to-speech engine obtains a document comprising text from a document source (e.g., memory or another computer) and converts some or all of the text in the document into an audio file. A thin-client (e.g., a user interface device) obtains the audio file from the server via network connection and an audio output device associated with the thin-client plays the audio file to the user of the thin-client. If the user desires to make a comment about the document, the user may provide verbalized input (e.g., comments and/or annotations) to an audio input device associated with the thin-client. Once the user provides such input, the input is transmitted to the server computer where the file is stored as an audio comment file (e.g., in the associations data structure). The server computer comprises an annotator that is configured to associate the audio comment file with a location in the document that corresponds to the portion of the audio file playing when the user provided the comment.

The invention also contemplates a method for annotating a document. Computer software may complement the method by performing some or all aspect of the process described. One embodiment of the invention is a method for annotating a document that comprises: generating authentication information of a user desiring access to a document; allocating an associations file structure for the user; obtaining the document from a memory medium via an interconnection path configured to access the document, the document having text elements; obtaining a first annotation of the text document, the first annotation having a first set of audio elements; converting the text elements to a second set of audio elements; associating the first set of audio elements with the second set of audio elements to generate a playback document; generating an audible playback of the playback document to the user when the user indicates a desire to hear the document; obtaining verbalized comments from the user via an audio input mechanism upon activation of an annotation trigger during the audible playback; associating the verbalized comments with a location in the playback document corresponding with the occurrence of the annotation trigger during the audible playback; and storing the location and the authentication information of the user and the verbalized comments in the associations file structure.

DETAILED DESCRIPTION

A method and apparatus for annotating documents is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

It is important to note that any type of individual who has a need to review documents may utilize one or more aspects of the invention. Movie producers, directors, actors, and other entertainment industry people as well as doctors, lawyers, teachers, students, businessmen, and many other types of individuals encounter the problems solved by embodiments of the invention. Thus, it should be clear to one of ordinary skill in the art that there are multiple contexts within which to utilize the method and apparatus for annotating documents described herein.

System Overview:

In one or more embodiments of the invention, the apparatus and methods described herein allows users to review and add any number of annotations (i.e. add comments) to a digital document such as movie scripts, books, etc. from anywhere in the world. For instance, the invention may play the document to the user via an audio output mechanism and provides the user with a way to comment on the document by simply speaking to an audio input mechanism. Any type of computational device may be configured to embody the invention and thereby provide the user with an interface to comment on or review comments about a particular document. Some examples of the type of devices that can be configured to implement embodiments of the invention include, the components of an automobile sound system, a cell phone, a land-based telephone, a personal computer (e.g., a PC or a PDA), dictation device, or any other system capable of accepting audio input and output. Each of the devices that embody the invention may access the document so as to provide the user with a way to review documents from multiple locations using multiple types of devices. The user may, for example, begin reviewing a document in an automobile, continue to review the document via a cell phone, and finish reviewing the document from home using a regular phone line.

Figure 1:
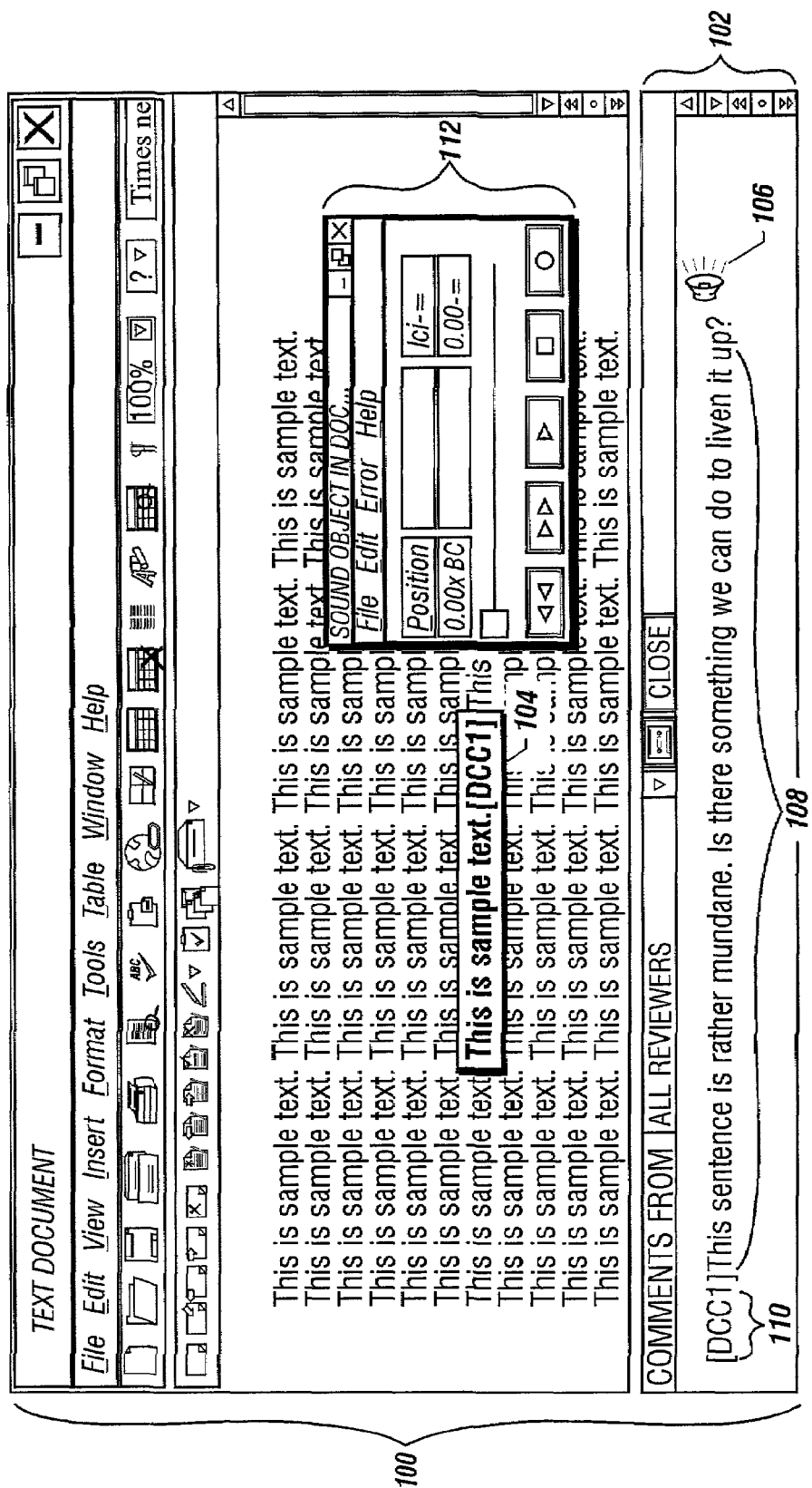
FIG. 1 illustrates a word processing environment that contains a way for users to manually insert comments into a document.
Figure 2:
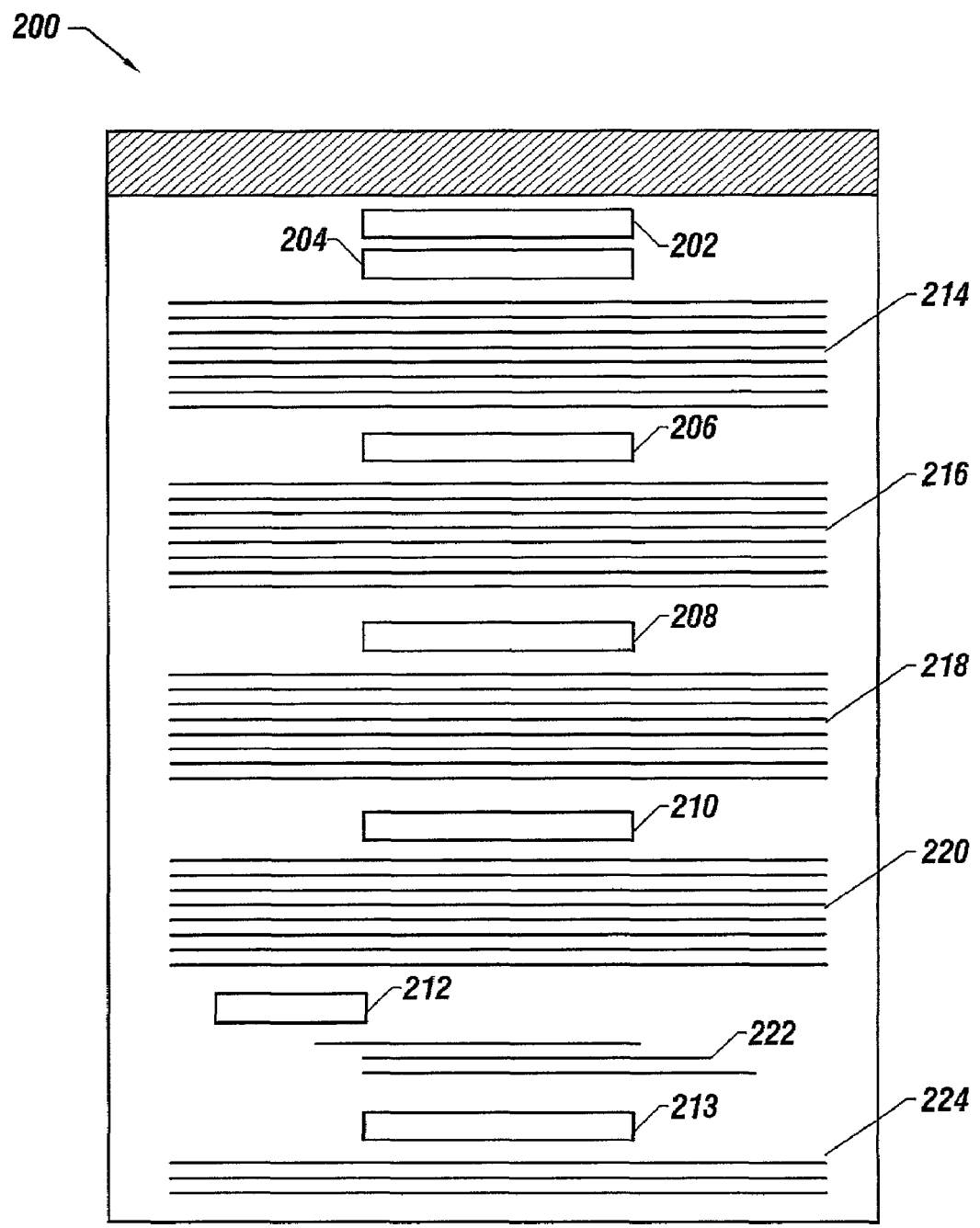
FIG. 2 illustrates a representation of a data file as used in a prior art audio editing device.
Figure 3:
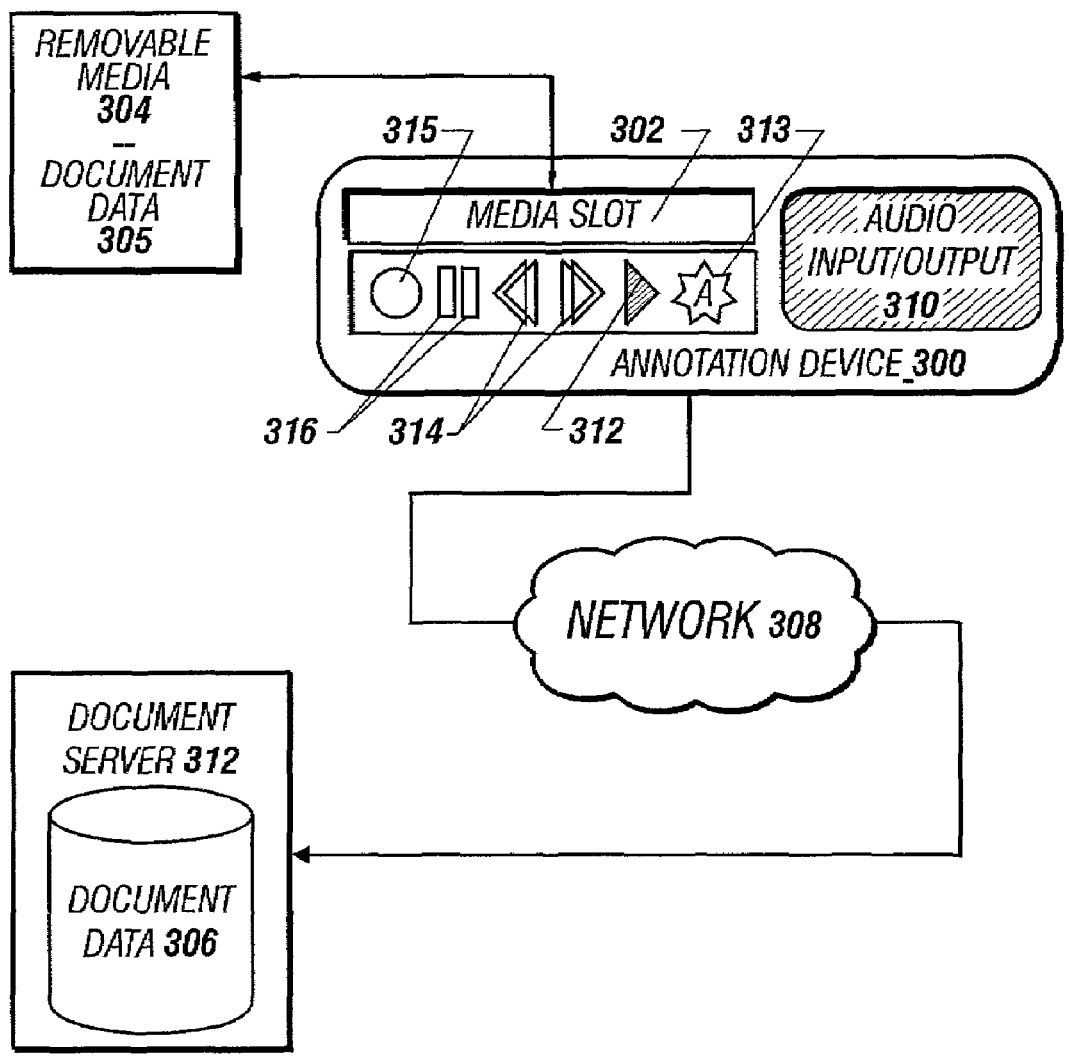
FIG. 3 provides an example of the command interface associated with an annotation device implementing an embodiment of the invention.

If a user wishes to review the contents of a document while the user is at a remote location (e.g., in an automobile), the user may utilize a device (see e.g., FIG. 3, annotation device 300) implementing one or more embodiments of the invention to obtain and play an instance of the document the user wishes to hear. The user may provide documents to the device via any type of removable media 304 (e.g., flash memory, floppy disk) comprising document data 305. The user may insert such removable media into media slot 302. In accordance with one embodiment of the invention the device can also be configured to obtain document data 305 from server 312 via network 308 (e.g., a wireless network, the Internet, a radio frequency (RF) network, cellular network, etc. . . . ). Documents typically originate as text data (e.g., Microsoft Word™ files, HTML files, XML files, or any other type of ACSCII or binary data representing a document) and are converted to audio data prior to playback (e.g., via a text-to-speech operation which may be referred to in one embodiment of the invention as a document processing engine). However, the invention contemplates embodiments configured to interact with multiple types of documents and may be adapted to provide users with the ability to review any type of digital document.

The text-to-speech operation that prepares the document data for audible playback to the user may occur at server 312 or at annotation device 300. In one embodiment of the invention, the user of annotation device 300 may begin reviewing a document by identifying which document to review and selecting play button 312. This causes the device to audibly playback the document to the user via audio output 310. If the document was originally text, the device converts the text into sound files (e.g., via the text-to-speech engine) before it sends the sound data to audio output 310. Any time during playback of the document, the user may verbally insert comments into the document by selecting annotate button 313. Upon activation of annotate button 313, annotation device 300 begins to collect audible comments provided by the user via audio input 310. Thus, the annotation device comprises a mechanism such as a microphone for collecting audible words (e.g., comments/annotations) from the user.

Each comment the user provides is stored by the system in memory (on the client device or the document server) and associated with a location in the document that is contextually relevant to the comment. If, for instance, the document is a script, the person reviewing the script may insert comments about a particular scene or treatment at a point in the document that correlates to the scene or treatment to which the comment pertains. If the user makes a comment about scene 1, that comment is associated with scene 1 so that if another individual revisits the document after the first user inserted the comment that individual can review the first user's comments along with the contents of the document.

If the user wishes to forward or rewind to a certain section in the device, the user may utilize forward/rewind button 314 to reach a certain place in the document. Button 314 therefore provides the user with a way to quickly forward to or rewind to relevant portions of the document. In one embodiment of the invention, button 314 comprises a shuttle/jog button such as the type utilized in linear editing. Stop button 315 provides users with a means to stop playback of the document. The invention may also comprise pause button 316 which when depressed causes playback to suspend for a certain interval of time until the user indicates by selection of another button to resume playback of the document. One embodiment of the invention contemplates the use of voice-activated software in order to implement the functions associated with buttons 312-316. In this embodiment, the user may annotate a document by verbally issuing an annotations command while the document is playing.

Once the annotation device obtains comments from the user, the comments are stored in a digital memory medium for later use and/or processing. The stored comments may, for example, be converted from audio data back into text data via a speech recognition engine (SRE). Thus, the comments associated with the document may be stored in text and/or audio form. If the same or another user plays the document back at a different time, the device obtain the originally sampled audio from memory and plays it back when the user is listening to the point in the document where the comment was previously given. In one embodiment of the invention, the user who provided the comment is audibly identified when the comment is played. If, for example, a user named user 1 made comments about a particular portion of a document, the device would identify, at the time the comment way played, that the comment originated from user 1. Thus, the device provides users with a way to identify who each set of comments originated from. The user reviewing the document may elect to hear comments from certain users while excluding comments from other users. If, for instance, the reviewer wishes to hear user 1's comments, but not user 2's comments, the review may request that the device only playback user 1's comments.

Figure 4:
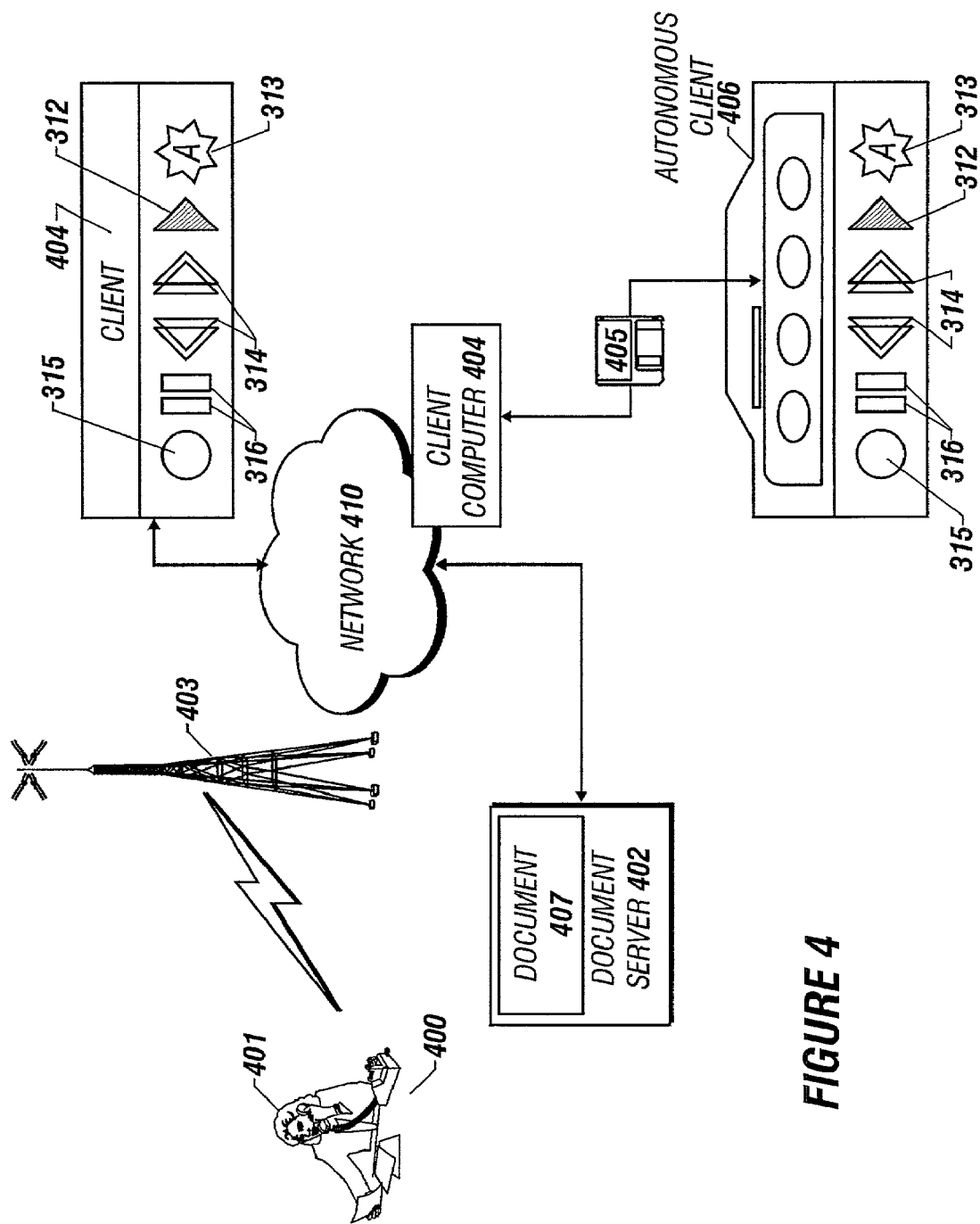
FIG. 4 is an illustration of some of the types of apparatus utilized in accordance with one embodiment of the present invention to annotate a document.

FIG. 4 is an illustration of some of the different types of annotation devices that may be utilized to annotate a document. Each type of device provides the user with a means to annotate a document from a different location. The illustration of FIG. 4 shows user 400 desiring to comment on document 407 located in document server 402. User 400 may accomplish this by utilizing device 404, 406, or 401. Annotation device 401 comprises a land-based telephone (e.g., a payphone, home phone, business phone, cell phone, etc. . . . ).

In the embodiments where annotation device 401 is a wireless device, wireless tower 403 may be used to interconnect between annotation device 401 and communication network 410. Annotation device 401 may comprise a "smart" device configured with adequate processing power and memory to handle the requirements of the present invention. For example, if annotation device 401 comprises a smart mobile client, annotation device 401 should have the computation power to perform the annotating functions described in FIG. 5 in addition to the control functions 502 for playback of the original document.

In another embodiment, annotation device 401 is a "thin" device such as a land telephone or RF device. In the land telephone configuration, annotation device 401 provides the playback control functions 502 of FIG. 5 for playback control of the document. For example, the telephone keypad keys or appropriate voice commands may provide the playback control functions. The FIG. 5 functions depicting annotating engine 500 and speech recognition engine 510 are performed in one embodiment of the invention in document server 402.

Annotation device 401 may comprise any device with access to different types of communication interconnects. An embodiment of the invention contemplates the use of any type of interconnection fabric that provides one or more suitable communication paths for carrying data between multiple types of computational devices. The interconnect fabric may be a type of wireless transport mechanism that may act as a carrier wave for data. For example, an embodiment of the invention may utilize a Cellular Digital Packet Data (CDPD) network, a Global System for Mobile (GSM) network, a Mobitex network, and/or any other type of radio, satellite, or wireless communication channel that can establish a link between multiple devices. Annotation device 401 may, for example, transmit data to or receive data from communication network 410 (e.g., the Internet) to document server 402.

Annotation device 401 provides user 400 with an interface for controlling the output of document server 402. User 400 may, for example, utilize annotation device 401 to connect to a system (e.g., server 402) configured to audibly play documents (e.g., document 407) to user 400. In this embodiment of the invention document server 402 may utilize one or more components of a voice mail system to play document 407 to the user. The voice mail system is adapted in such a way that it can access and play document files that reside in a predetermined location via network 410. If the files accessed are text data the system may convert them to audio data via a text-to-speech engine. When the user access the system, the user selects a document to hear (e.g., by navigating a hierarchical menu structure) and the system plays that document to the user. If the user wishes to provide comments about the document the user indicates to the system that a comment is going to be provided (e.g., by pressing a key on the telephone keypad). When the user makes such an indication, the system pauses playback of the document and marks the location of the comment. The user may then provide a comment to the system by making a verbal statement to the system. The system records the user's comments and associates that comment with the location in the document identified by the user. If the same or another user plays the document back again, the system plays the previously provided comment when the system reaches the location in the document where the user previously submitted a comment. Thus, users may utilize annotation device 401 as an interface to document server 402 so as to listen to and submit comments about a particular document.

Annotation device 404 and 406 comprises a client device (such as the one illustrated in FIG. 3) configured to obtain document data from one or more sources. Device 404 comprises a personal computer, PDA, or some other type of client computing device configured to obtain document 407 from document server 402 via network 410. In one or more embodiments, annotation device 404 may be used for the annotating function. Annotation device 404 is connected to document server 402 through communication network 410. Annotation device 404 is capable of processing data from removable storage media 405, from document server 402, or from any other data source. Data that is stored (e.g., document 407) may comprise the document to be annotated or the annotated document. In the case where the document data is contained in removable storage media 405, client computer 407 may be used to transfer the data to document server 402. For example, removable storage 405 may contain data processed in autonomous client 406.

Autonomous client 406 comprises another type of device that may utilize one or more embodiment of the invention. Users of autonomous client 406 may manually provided document data taken from client computer 407 via removable storage media 405. Autonomous client 406 is capable of processing document file stored in removable storage 405. In one or more embodiments, autonomous client 406 does not have direct connection to communications network 410. In this configuration, autonomous client 406 possesses the full capability to perform the functions described in FIG. 5. Thus, autonomous client 406 comprises enough components to act as a stand-alone device for annotating documents.

Autonomous client 406 includes control functions for playback of the document contained in removable storage 405 such as Play, Rewind, Fast-Forward, Pause, Stop, Annotate (i.e. mark), etc. It will be apparent to one of ordinary skill in the art that other playback control functions not described in this disclosure can be added, subtracted, or substituted to provide the capability for optimum playback of the document. For example, it may be desirable to have the ability to enter a user identification, to vary playback speed, to provide jump functions, and find functions. Thus, autonomous client 406 may be modified to incorporate these and other playback control functions.

Document server 402 maintains the current copy of the annotated document. In one or more embodiments of the invention, document server 402 is on a worldwide communications network so that users may log on (using device 401, annotation device 404, or client computer 404) to comment on a particular document from anywhere in the world. Document server 402 also maintains the capability to perform some or all of the processing functions described in this disclosure. For example, document server 402 has the ability to perform the full processing described in FIG. 6 as well as store and maintain the original document and its annotations. Document server 402 may also maintain a security mechanism that prevents unauthorized access to the documents. For example, document server 402 may require a logon ID and password or perform some other type of authentication before access can be granted to the document file contained therein.

Annotating Engine

Figure 5:
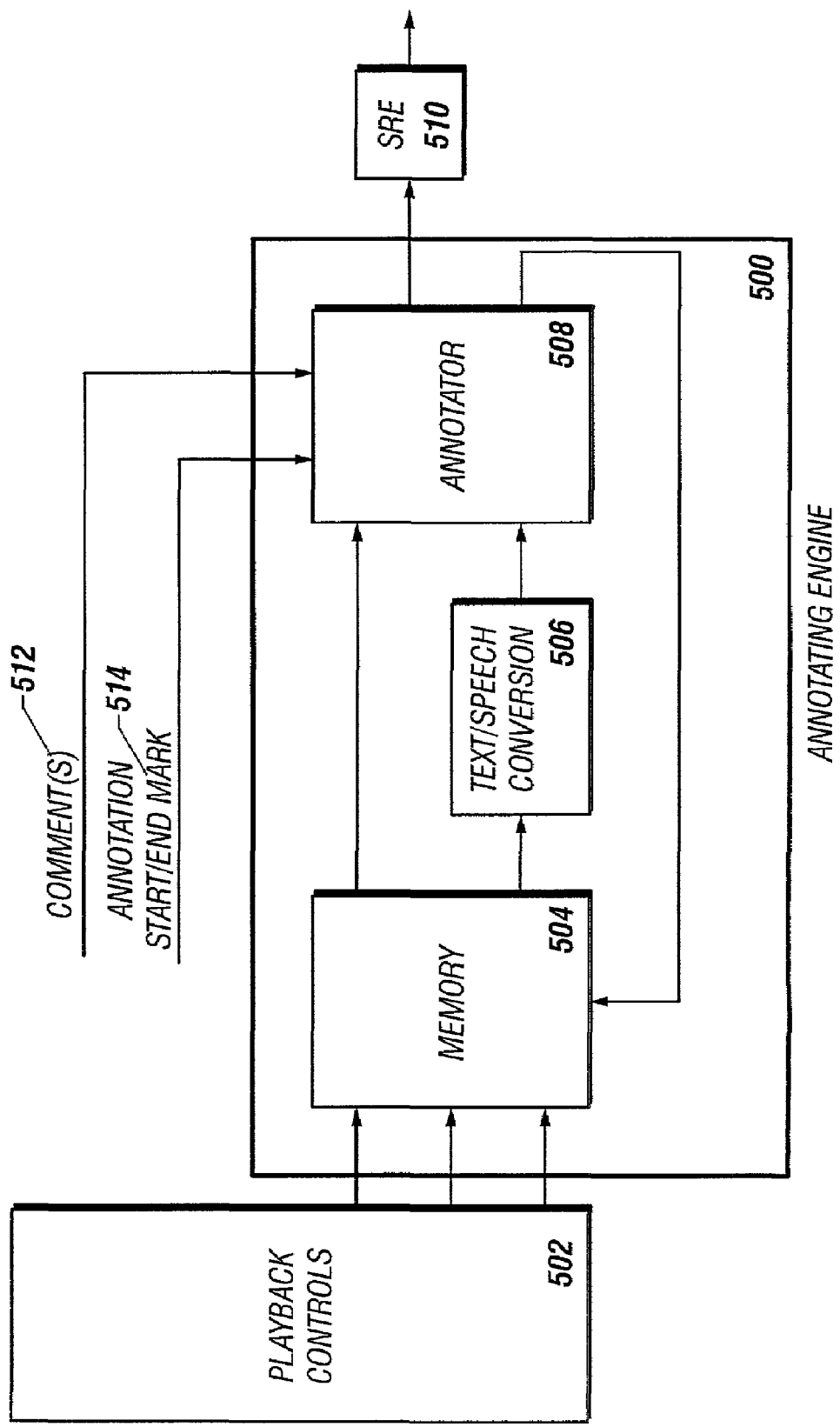
FIG. 5 illustrates the basic components for annotating a document in accordance with one embodiment of the invention.

One or more embodiments of the present invention comprise an annotating engine as shown in FIG. 5. Annotating engine 500 accepts control inputs from playback controller 502 and comments 512 from a user. For example, when a user desires to comment on a document contained in memory 504, the user performs any necessary authentication to gain access to the document. After access is granted, the document in memory 504 may be played back using controls functions from playback controller 502. Memory 504 comprises any type of memory (e.g., flash memory, removable storage media, static storage, or any other type of computer memory).

Figure 11:
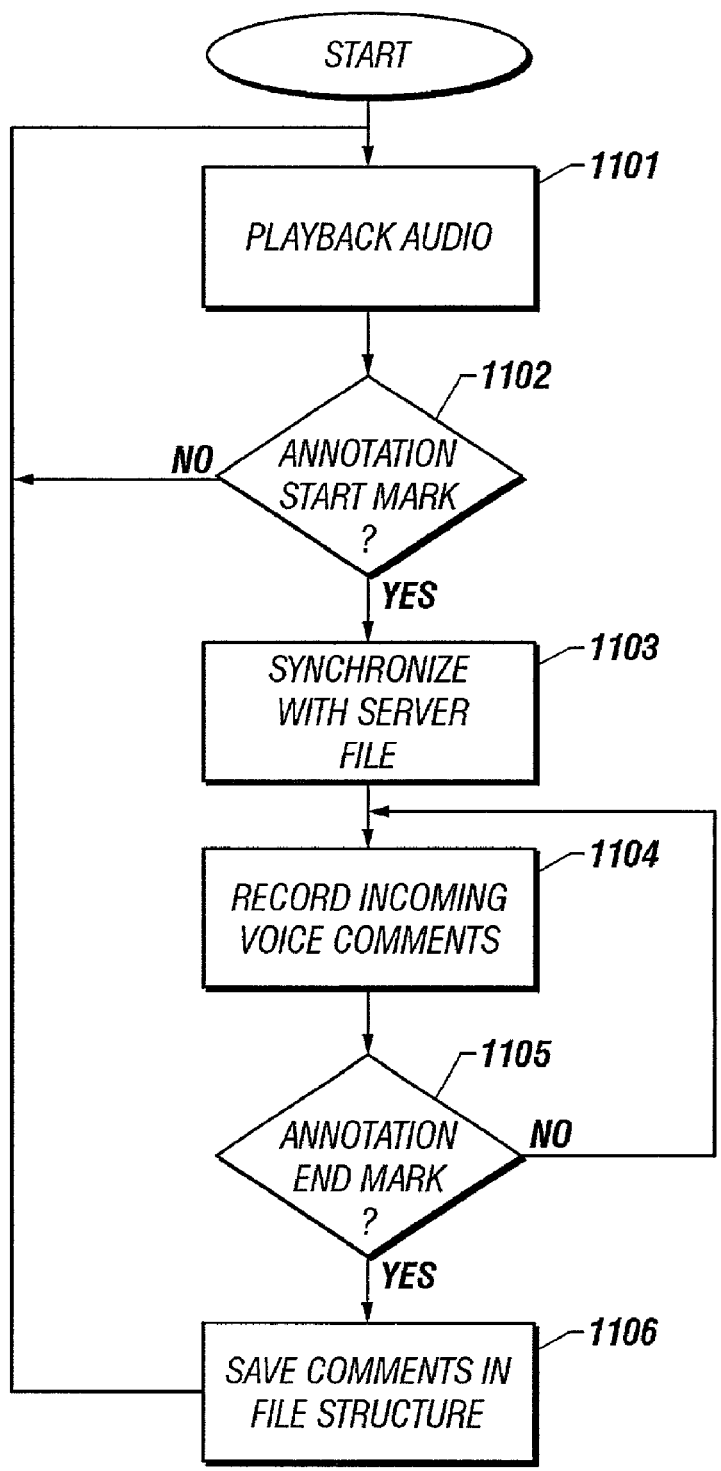
FIG. 11 is a flow diagram of the processes performed by the document server when interacting with a thin terminal according to one embodiment of the present invention.

Once the user provides comments 512, annotating engine 500 associates comment 512 with the location in the document where the comment was provided. For example, annotating engine 500 preserves the original document in memory 504 and creates the associated files (i.e., Annotations file, Annotations index file, and Annotations names file) as shown in FIG. 11.

Playback controller 502 provides playback instructions to the annotating engine. Playback controller 502 provides commands such as play, rewind, fast-forward, pause, stop, and annotate (i.e. annotation start mark 514) to control the playback of the data in memory. Playback control functions are not limited to those listed above, other functions that may enhance playback to the user such as volume control in embodiments that employ audible playback as feedback to the user. Other examples may include variable speed controls, jump and find functions. For example, the user may desire to jump to the beginning of the document or to a known point in the data.

During playback, the document may be converted to speech in text/speech conversion block 506 if the document is text and if audible playback is desired. Text/speech conversion block 506 comprises a text-to-speech conversion engine configured to accept text as input and generate audio as output. Some examples of text-to-speech engines that text/speech block may comprises includes text-to-speech engines such as the ones made by Lernout & Hauspie, Microsoft™, or any other text-to-speech provider. A user desiring to add comments to the document at a particular point during playback generates an annotaion start mark 514 by selecting performing an action such as selecting annotate button 313. However, the invention contemplates other mechanisms that may cause an annotation start mark 514 to occur. For instance, annotation start mark may be voice activated or activated by any other command provided by the user who desires to provide an annotation.

At the occurrence of annotation start mark 514, audio playback of the document pauses and annotator 508 begins recording user comments. A subsequent annotation mark 514 (e.g., an end annotation mark) may signify the end of user comments for that location in the document. In some instances the passage of a certain period of time causes the annotation end mark 514 to occur. If, for example, after causing an annotation start mark 514 to occur, the user does not speak for some interval of time, the annotation end mark 514 will occur and thereby mark the end of the user's comment.

In one embodiment of the invention, annotator 508 has the capability to transmit sound and text data to the user. For example, audio sound generated in text/speech conversion block 506 may be transmitted to the user via a speaker system. If the system is part of an automobile sound system, for instance, audio data may be generated and sent via the speaker system associated with the automobile's stereo system. If the document contains sound data, the annotator 508 utilizes a media player to play the sound data directly to the user via the speaker system. Annotator 508 has the capability to receive and record sound and text data. For example, user comments 512 may arrive from a sound input source such as a microphone and recorded in memory 504 by annotator 508. Thus, annotator 508 comprises or is associated with an audio input/output mechanism that can collect audio data from or provide audio data to the user.

Annotator 508 determines the location in the document under review that corresponds to occurrence of the annotation start mark 514. This location signifies the place where the user began making comment 512 (e.g., the start). Upon receipt of the annotation start mark, annotator 508 determines the current location of the document under review. This location is stored, in one embodiment of the invention, as part of the associations files discussed in FIG. 11. Concurrently, annotator 508 starts recording the user's comments 512 until receipt of an end annotation mark 514. During recording of the user's comment, annotating engine 500 suspends playback of the document under review at the point corresponding to the location where the user began making comment 512. Playback of the document resumes at completion of recording of the user comments. For instance, playback resumes when the user submits an end annotation mark 514.

After playback of the document and recording of user comments are complete, annotator 508 stores the associations information (See FIG. 11) into memory 504. The associations information comprises data memory that represents the comments provided by one or more users. Each comment is typically associated with a certain document and/or a certain user. In one embodiment of the invention, the associations information is stored in a data structure comprising an annotations names file, annotations index file, and annotations file. The specifics of this associations data structure are discussed later in this specification. When the annotation device utilizes the associations data structure, the integrity of the original document is not compromised during processing.

Annotator 508 converts the recorded data to proper format for storing. In one or more embodiments, the comments are stored as sound data in a WAV file or any other audio format capable of storing sounds data (e.g., MP3, RealAudio™, etc. . . . ). Comments may also be converted to text for storage or for transmittal as data packets using protocols such as the Wireless Applications Protocol (WAP) in cases where processing is done in a wireless client and where text transmission is desirable over voice transmittal. When conversion of the comments to text is desired, Speech Recognition Engine 510 may be used to convert the comments to text. In one or more embodiments, annotator 508 provides the user the capability to review comments before saving the comments in the data structure.

Figure 6:
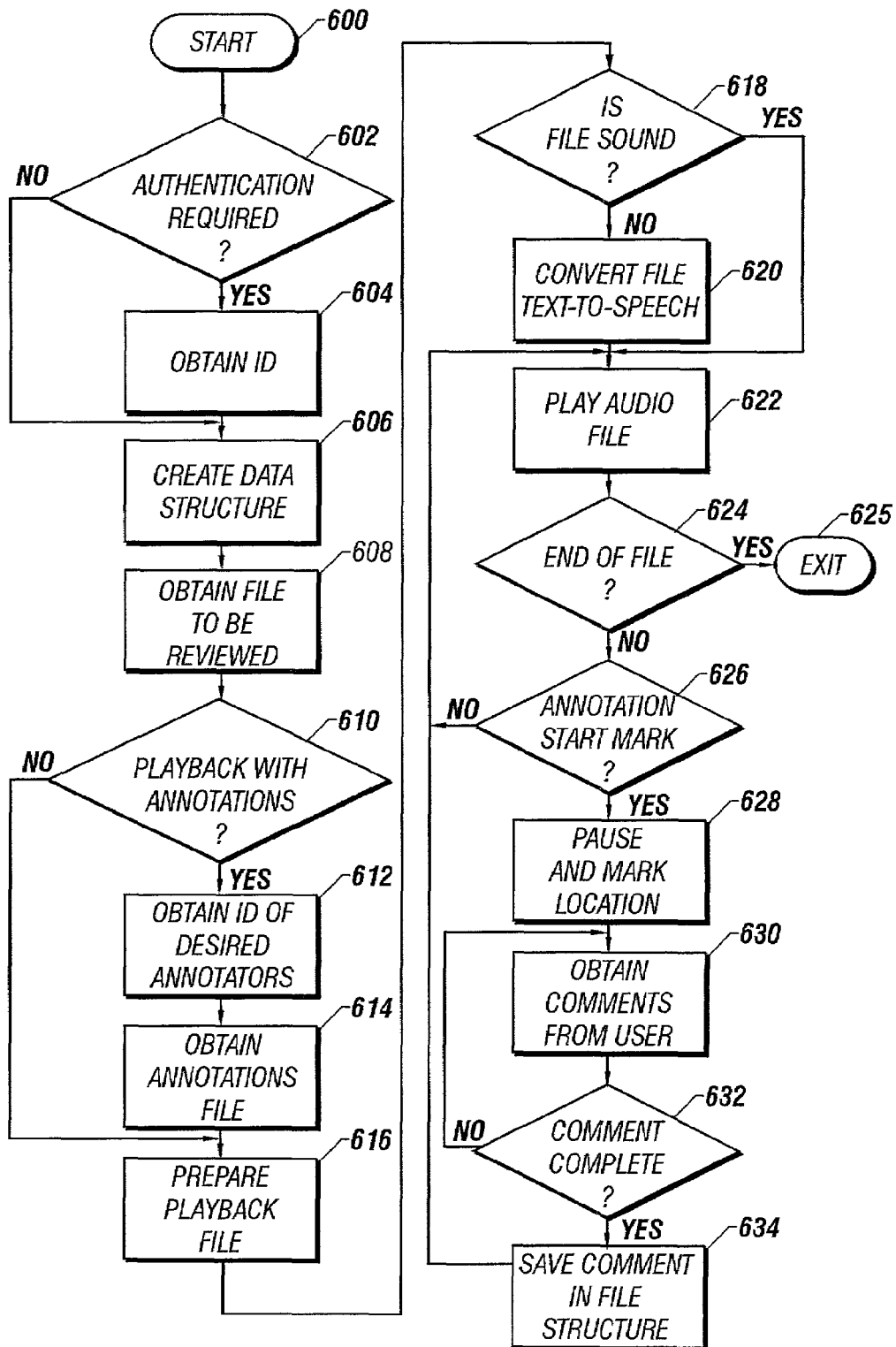
FIG. 6 provides an example of the process utilized in accordance with one embodiment of the invention to annotate a document.

Process Utilized to Obtain/Playback Annotations:

FIG. 6 provides an example of the process utilized in accordance with one embodiment of the invention to annotate a document. The process may be implemented in hardware and/or software form and may, for example, comprises computer readable program code tangibly embodied in a computer readable medium such as a processor, or memory coupled to the processor. In other instances, the invention executes in memory such as a hard disk, floppy disk, and/or any other form of memory capable of storing computer readable program code. The computer program or hardware device is referred to herein as the system. As will be discussed herein, certain executable and non-executable portions of the files that are used by embodiments of the invention may be distributed or obtained via a network (e.g., a wireless network).

When the system enters an execution state at start point 600 the system waits for input from the user. In accordance with one embodiment of the invention input from the user may require authentication. Authentication provides the system with a way to determine which user made a particular set of comments. If multiple users comment on the document, the authentication data enables the system to discern between comments provided by different users. If authentication is required (e.g., at step 602), the system obtains a unique identifier (e.g., at step 604) from the user or the system associated with the user. If such authentication is not required, the system allocates a portion of memory to the system for one or more data structure(s) (e.g., at step 606) associated with the annotations to be provided by the user. One of ordinary skill in the art should recognize that the invention also contemplates embodiments where the system allocates memory earlier or later in the execution process.

Once memory is allocated for the data structure, the system obtains the file that is to be reviewed (e.g., at step 608). This file typically comprises a document containing data such as text and/or other elements. Documents may, for example, originate as text files (e.g., ASCII, EPSIDIC, etc. . . . ), audio files, (e.g., MP3, RealAudio™, WAV, etc. . . . ), image files (e.g., GIF, JPG, TIFF, etc. . . . ) movie files (e.g., AVI, MPEG, RM, etc. . . . ), or any other type of file containing data the user of the system may wish to review and subsequently comment upon. When the file to be reviewed (or the location of the file) is loaded into memory the system waits for the user to indicate a desire to playback the file with annotations (e.g., at step 610). If the user initiates (e.g., by depressing a play w/annotations button or stating a verbal command) a command to begin playback with annotations, the system responds by obtaining the unique identifier (e.g. ID(s)) associated with the user(s) whose comments/annotations the user operating the system wishes to hear. If for example, the user of the system wishes to hear comments from one or more certain individuals, the ID(s) associated with those individuals are supplied to the system at step 612. The system may default to a setting that plays back all the comments associated with the document or in other instances the system may prioritize the comments by playing comments from some individuals prior to comments from others.

When the system identifies which set of comments to obtain it obtains one or more annotations files (e.g., at step 614). The annotations file is accessible in one embodiment of the invention via an index or set of pointers. Thus, the appropriate annotations file may be accessed by utilizing the index to determine the location of the comments the operating user wishes to hear. Each annotations file comprises one or more files that point to or contain comments from one or more users. In one embodiment of the invention, the annotations file contains a list of memory locations, network addresses, or hyperlinks that reference or comprise user comments. The annotations file may contain components located within memory or distributed across multiple computers accessible via a network (e.g., a wireless network). In one instance, comments are made accessible via a computer network such as the Internet or some other mechanism for obtaining digital files having user comments.

If the user has not initiated a command to review the document with annotations, the system bypasses steps 612 and 614 and executes step 616. At step 616, the system prepares a document file for playback. In the instances where the user has previously indicated a desire to listen to the annotations, the system prepares the annotations file and the document file for playback by associating the two files with one another in a playback file. If the user does not want to hear any annotations, the system prepares the document file for playback without any annotations. Both the document file and the annotations files may comprise text, sound, and/or any other type of data. In accordance with one embodiment of the invention the document file originates as text and the annotations file(s) contains audio data that is related to a particular location in a document. However, both the document file and the annotations file may contain other types of data.

In one embodiment of the invention, the system reviews the type data or contents of the playback file to determine what operations to perform on the playback file. At step 618, the system may determine whether the file is a sound file. If the system encounters a sound file, the system converts the file (e.g., at step 620) from audio data to text data by using a text-to-speech engine. The location of the text-to-speech processing may vary depending upon the processing capacity of the system that is utilized. The text-to-speech conversion may take place on the computer conducting the playback or on a computer separable from the computer performing the playback. After the text-to-speech conversion occurs, the system plays the audio file (e.g., at step 622) via an audio output mechanism. If the system reaches the end of the file (EOF), without the user providing any comments, (e.g., step 624) the system may exit at step 625. However, if the user indicates a desire to provide comments/annotations (e.g., at step 626) by selecting an annotate button, verbalizing a comment, or by some other mechanism for issuing a command, the system executes step 628 where it pauses playback of the audio associated with the text file and inserts a mark at the appropriate location. The mark identifies the location where the user initiated an annotate command. Once the mark is set, the system obtains comments from the user (e.g., at step 630) via an audio input mechanism such as a microphone. The comment may comprise any type of verbalized or non-verbalized input that can be associated with the document about which the user is commenting upon. A comment about a particular segment of text in the document may, for example, contain reference to a Web address that contains information the reviewer wishes to share. Comments may point to other comments so that each comment may be related to or associated with other types of data. The reviewer may therefore reference other URLs or data in a comment and the user listening to the reviewer's comments may access that data.

The system monitors the input to determine when the user finishes providing the comment. When the user finishes the comment, the system saves the comment in the appropriate location. The system may, for example, place the comment into a memory location associated with the data structure allocated at step 606. In some instances, each comment the user provides is saved in the annotations file and stored at any location capable of storing digital data.

Allocation of Processing Responsibilities:

When a device is configured to obtain document data and/or annotation data over a network (e.g., a cell phone network, wireless network, etc. . . . ) so that the user can interact with such data, the type of device attempting to obtain access to the data is important. If, for example, the system has sufficient processing capacity, and the network utilized to connect to the system has a low bandwidth or high cost associated with it, the amount of data sent to the device should be minimized and the processing should be performed on the system. If, however, the system does not have any processing resources or has minimal processing capabilities, the processing should be performed on the computer supplying the document or annotation data (e.g., the server computer).

Figure 7:
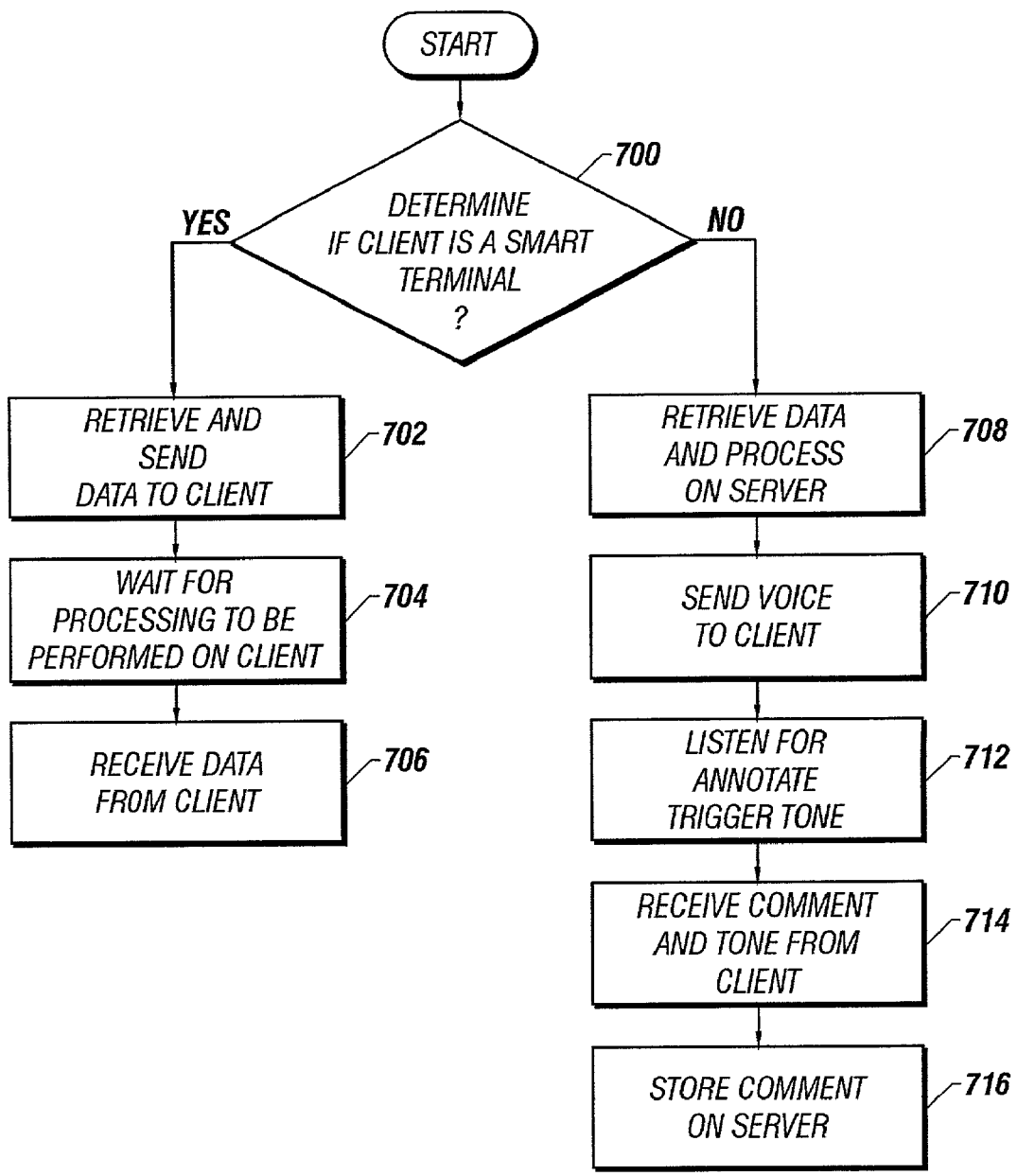
FIG. 7 illustrates the process utilized by an embodiment of the invention to allocate processing responsibilities depending on the processing power of the system utilized to listen to and obtain the document or comment data from a computer network.

FIG. 7 illustrates the process utilized by an embodiment of the invention to allocate processing responsibilities. The process illustrated begins at step 700 where a determination is made as to whether or not the system attempting to obtain text data from a network source for conversion to audio data and then subsequent playback to the user comprises a smart mobile device. If the system (e.g., the annotation device) comprises a smart mobile device, the network source, typically document server 402, retrieves the text data from memory (e.g., at step 702) and prepares and transmits the text data to the smart mobile device (e.g., at step 704). In one embodiment of the invention, the smart mobile device performs the annotating engine functions described above. For example, the type of processing performed at the smart mobile device typically comprises a text-to-speech operation that converts the text supplied from the network source into audio data that can be played to the user. Each portion of text may, for example, be processed utilizing Digital Signal Processing (DSP) techniques to enhance the quality of the audio data and/or encode the data into an audio format that the smart mobile system is capable of playing. The smart mobile device may for example, convert the text into an optimized Real Audio™ file (e.g., streaming media file) prior to playing the file to the user via an embedded or software Real Audio™ player. Once the processing is complete, the smart mobile device transmits some data back to the server (e.g., at step 706) for storage or further processing. For instance, if the user made a comment (e.g., at step 705), the smart mobile device may transmit the users comments as well as the location data associated with the comment back to the server for storage and/or processing purposes. The location data identifies where in relation to the text the user made a comment. The comment comprises the data inserted into the annotations file. It is important to note that the smart mobile device may also send other types of data back to the server for security or authentication purpose. The invention also contemplates the transmission of other types of data needed to maintain the link between the data sources and the smart mobile device.

In the instances where the outcome of step 700 indicates that the system connected to the data source is not a smart mobile device, but is rather a device which contains minimal or non processing capacity (e.g., a payphone or land line phone), the processing may be performed on a computer that has a higher capacity for processing data. Such processing may be performed on the data source or on any other computer accessible via a computer network. The computer tasked with performing such processing obtains the data and then converts the text file into an audio file (e.g., at step 708). The processing performed may also contain routines for optimizing the quality of the audio file in view of the device the file is going to be transmitted to. Once the text file is processed, the audio data can be transmitted to the device associated with the user (e.g., step 710). If, for example, the user is at a payphone or some other type of telecommunications device that does not have a mechanism for processing data, the audio file created by the server is transmitted to the user at the telecommunications device via the telephone network. The system tasked with performing the processing listens while it is playing back the document to the client for some form of command to start receiving comments (e.g. at step 712). If the user wishes to insert a comment into the document the user may generate a tone or some other sound via a telephone keypad or some other mechanism capable of generating a sound. In one embodiment of the invention, the user may depress a key (e.g., a number such as 1) or a simple verbal statement such as "insert comment" to indicate a desire to make a comment. Once the system receives the audible command, the system stops transmitting audio data and enters a listening mode. When the system is in a listening mode it picks up any verbal input (e.g., comments or annotations) provided by the user (e.g., at step 714). The system marks the location associated with the user comment and associates the comment with the document the user is commenting about. Once the user finishes providing the comment the system stores the comment in the annotations file for later access. The system may determine that the user has finished commenting when the user is silent for a certain threshold period of time (e.g., 30 seconds, 45 second, 1 minute, etc . . . ) or when the user indicates the comment is complete by depressing a key or button on the device that cause an audible noise to be generated.

Smart Client Configuration

Figure 8:
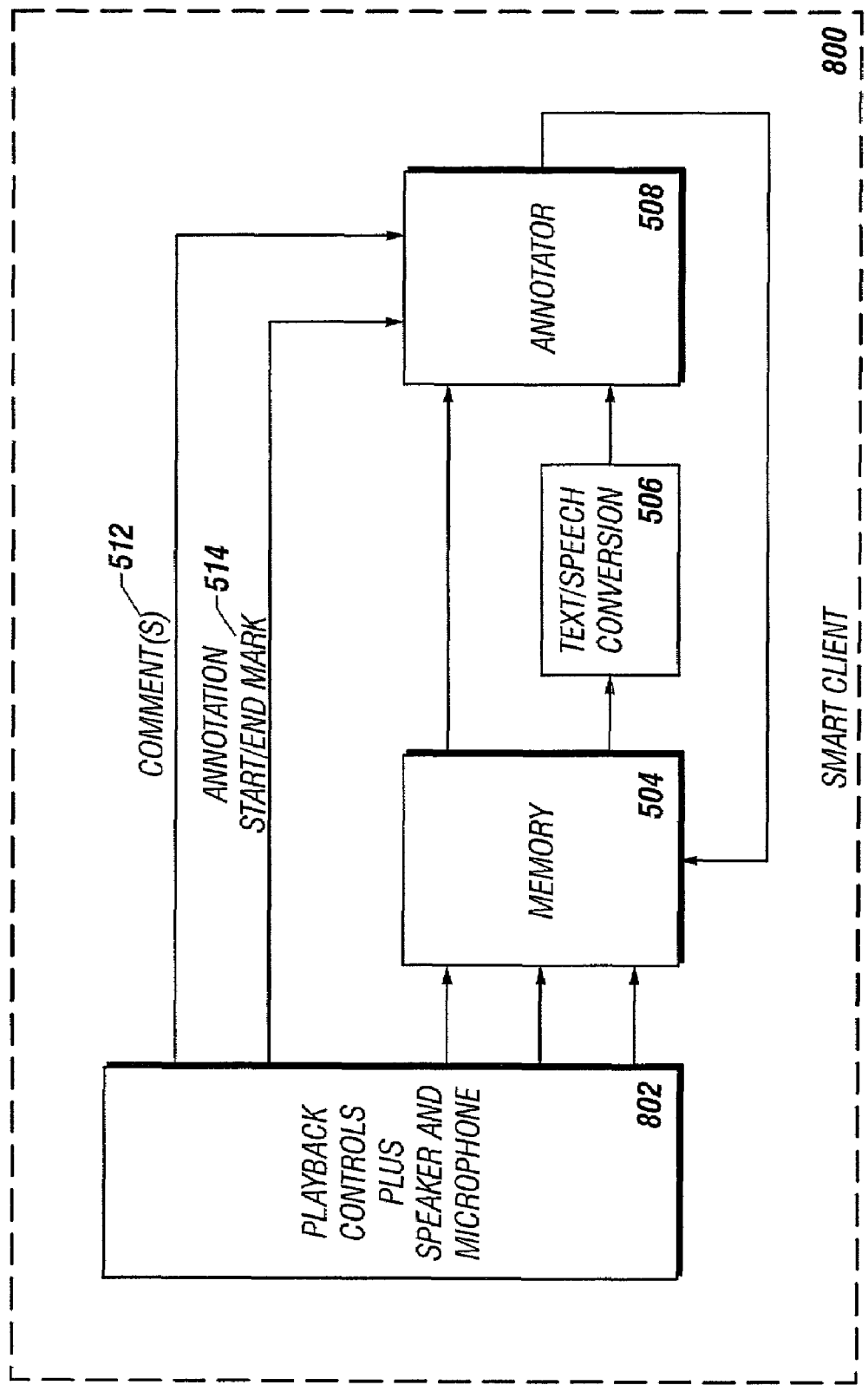
FIG. 8 is a schematic of a smart client configuration in accordance with an embodiment of the present invention.

FIG. 8 comprises a schematic of a smart client configuration in accordance with an embodiment of the present invention. As used herein, the smart client possesses processing power and control functions adequate to perform the processing required for the present invention. As shown in FIG. 8, smart client 800 encapsulates playback controls 802, memory 504, text/speech conversion 506, and annotator 508 functions. In one or more embodiments, memory 504 may be a removable storage media. In other embodiments, memory 504 is memory device such as random access memory, flash memory, optical memory, etc. For example, a wireless device such as a cellular phone may employ random access memory for temporary storage of the document transmitted as text messages via the wireless application protocol or any similar protocol.

Playback control function 802 is provided by controls available on the smart device. Block 802 also encompasses a speaker and microphone for audio input/output. In the instance where the smart device is a computer terminal, the keyboard functions may provide the controls required for control of document playback, navigation, and annotation. The smart device may be a device built specifically to provide the control functions (e.g. buttons or by use of voice commands) for practicing the present invention. In instances where a cellular phone is used, the keypad may provide the necessary controls for playback.

In one or more embodiments of the present invention, the text/speech conversion block 506 and annotator 508 may be provided as objects from the server to client 800 in the form of Java applets at log in. Java applets are executable objects in the form of bytecodes that are runtime compiled and executed by a Java Virtual Machine (JVM). In the case of a smart device with small footprint (i.e. limited processing power and memory), a "K" Virtual Machine (KVM) compiles and executes the applets. The use of Java applets or other form of machine independent code provides the flexibility to perform the processes of the present invention on any smart device with a Virtual Machine.

Figure 9:
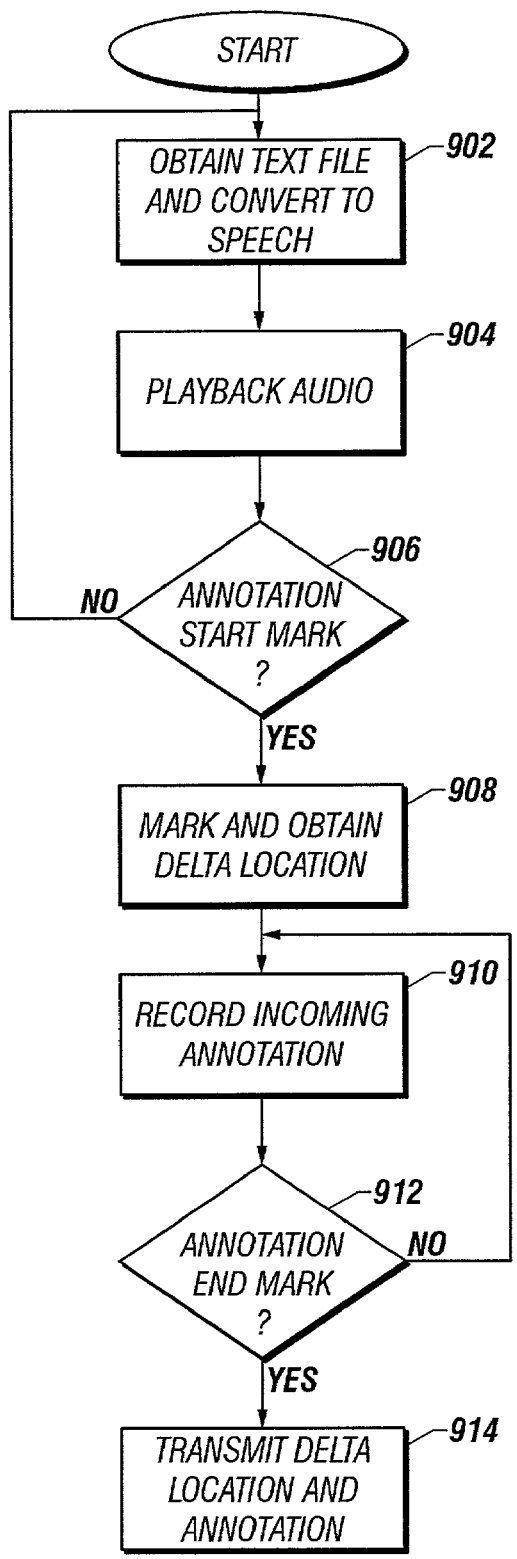
FIG. 9 illustrates the process utilized in accordance with one embodiment of the invention to annotate a document on a smart device with limited memory such that document data from the server is sent in packets to the smart client.

The Process Utilized by Smart Mobile Device with Limited Memory:

FIG. 9 illustrates the process utilized in accordance with one embodiment of the invention to annotate a document on a smart device with limited memory such that document data from the server is sent in packets to the smart client. For example, a wireless device utilizing the Wireless Application Protocol may receive the document in data packets for processing. Other device that are connected to the Internet may utilize protocols such as TCP/IP, UDP, or any other protocol that can encapsulate the contents of the document that is to be commented upon.

The processing performed by the smart device initiates at step 902 where the system obtains a text document and converts the text to audio data. For instance, at step 902 data packets transmitted to the device are processed and converted to speech for playback at step 904. If at step 906 an indication is received to start annotation, processing proceeds to step 908. Indication to start annotation may take any of the form described above such as a tone generated by a key entry or a voice command. Otherwise, playback continues with the process returning back to step 902 to receive more packets of data and continue until playback is complete or a start annotation indication is received.

If a start annotation mark (e.g., an annotation trigger) is received, playback is suspended. At step 908, the current location (i.e. delta location when referring back to the range of the data sent in the data packet under playback in relationship to the original document file) corresponding to the offset in the data packet being processed is noted and the annotator starts recording the annotation at step 910.

At step 912, a determination is made whether a stop annotation trigger indication is received. Stop annotation trigger may be generated in any of the forms described above such as a keypad input or voice command. If the trigger to stop annotation is received, processing proceeds to step 914. Otherwise, the annotator continues recording the incoming comments. At step 914, the delta location, which in one embodiment of the invention comprises the location in the current data packet under playback where the start annotation trigger was received, and the recorded annotation is transmitted to the document server using any desirable protocol. At the document server, the actual document location is determined by adding the offset (i.e. delta location) to the value of the location corresponding to the beginning of the data packet being processed. In one embodiment of the invention, the document server keeps track of the range of data sent in the data packet being processed. Thus, the document server and the annotation device work in connection with each other to identify the appropriate place in the document to insert comments while still synchronizing playback of the document. Processing continues at step 902 until the entire document has been processed or until the user suspends further processing.

Thin-Client Configuration

Figure 10:
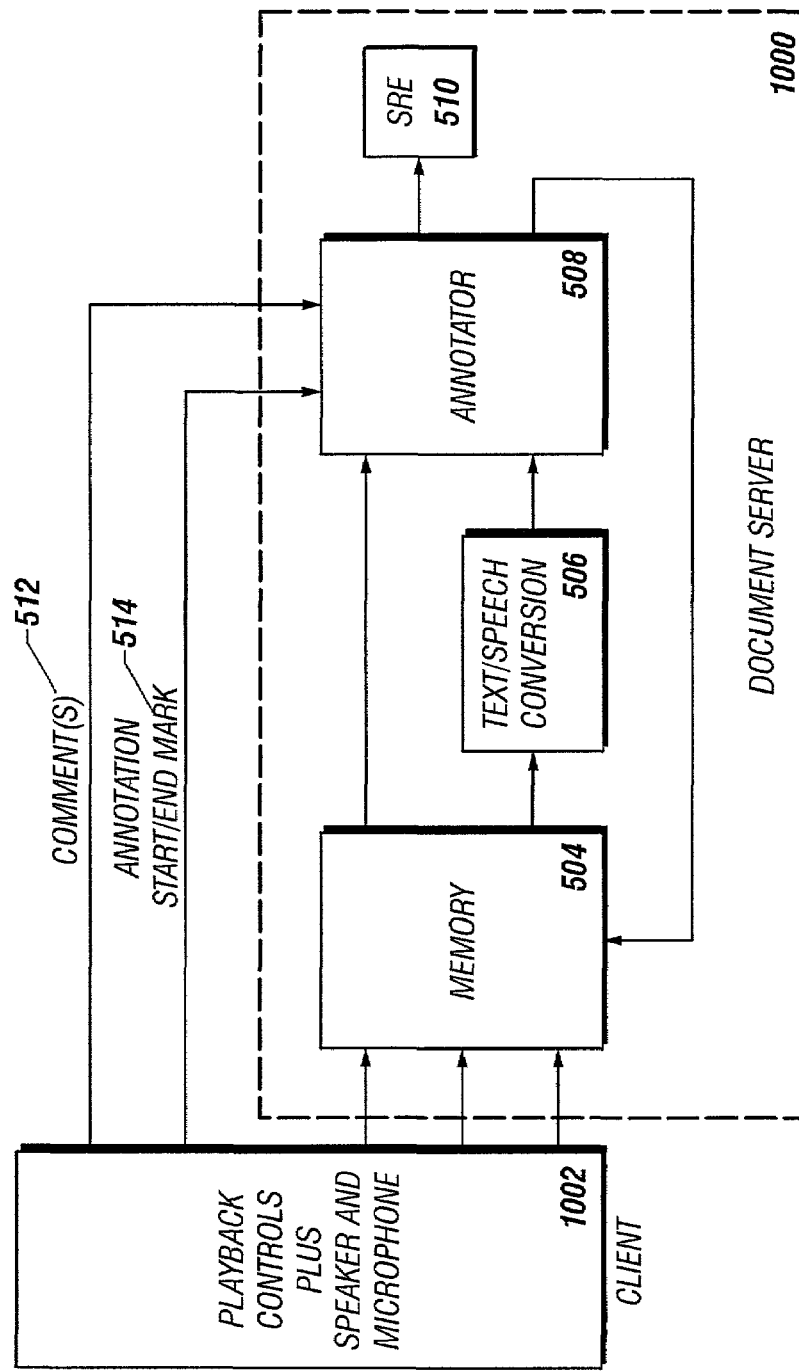
FIG. 10 shows a schematic of the thin client configuration according to one embodiment of the present invention.

FIG. 10 shows a schematic of the thin-client configuration according to one embodiment of the present invention. A user may access the present invention in the thin-client configuration. The thin-client configuration generally implies that little or no processing is performed at the client terminal. This is generally the case where a user accesses the system through a device like a land telephone or similar devices without sufficient processing power to handle the requirements of annotating engine 500 of FIG. 5.

Any device capable of accessing document server 402 (FIG. 4) may be used in the thin-client configuration if the user desires to perform some portion of the processing on the document server. For instance a smart client may be used in the thin-client configuration. Any time the user desires that the bulk of the processing be performed on document server 402, the thin-client configuration can be utilized. For example, network traffic considerations may require that a smart-client use a thin-client configuration and thereby perform processing on the server.

In the thin-client configuration, processes represented in block 1000 are performed on document server 402. The thin-client 1002 may perform limited processing such as generating of playback commands, transmitting and receiving voice commands, generating the annotation start mark command, etc. For example, where a telephone is used as a client, the keypad buttons may be used for the necessary playback commands. The telephone keypad provides convenient functions for playback control for example, the "#" key may be used as Fast Forward, the "*" key may be used as Rewind, and the numeric keys may be used for other functions. The thin-client may utilize any set of one or more keys to control the various types of playback functions.

FIG. 11 is a flow diagram of the processes performed by the document server when interacting with a thin-client device configured to perform annotating. After authentication of the user by the server and document to be played back is retrieved, playback starts at step 1101. For example, the user may be listening to the document through the earpiece of a telephone set. When the playback reaches a point where the user wants to add a comment, the user presses a button designated as the annotate button. This button generates an annotation mark in the form of a tone. In one embodiment of the invention, the annotation mark is referred to as an annotation start mark or an annotation trigger. Playback continues at step 1101 if the server does not receive an annotation start mark. However, if the server receives the annotation start mark at step 1102, it proceeds to step 1103 to synchronize the mark with the server file being played back. Synchronization may take multiple forms. For example, one embodiment may require synchronization back to the beginning of a sentence. Synchronization may also be at the beginning of a sentence since one can assume that a user does not typically want to insert a comment in the middle of a word. However, in some instances the system may allow the user to insert comment in the middle of a word (e.g., to correct the word or add a new word).

At step 1104, the server records the incoming voice comments from the thin client. Recording continues at step 1104 until another annotation mark (e.g., an end annotation mark) is received to signal the end of user comment at step 1105. If the end annotation mark is received, processing continues at step 1106. In one embodiment, the end annotation mark is triggered by a certain period of silence. At the end of recordation of the comments, the data is saved at step 1106 and playback resumes at step 1101 until end of the document is reached or the user indicates a desire to stop the playback. Stop playback may be indicated by simply hanging-up the handset, or the use of a button designated to stop the playback function.

File Structure

Figure 12:
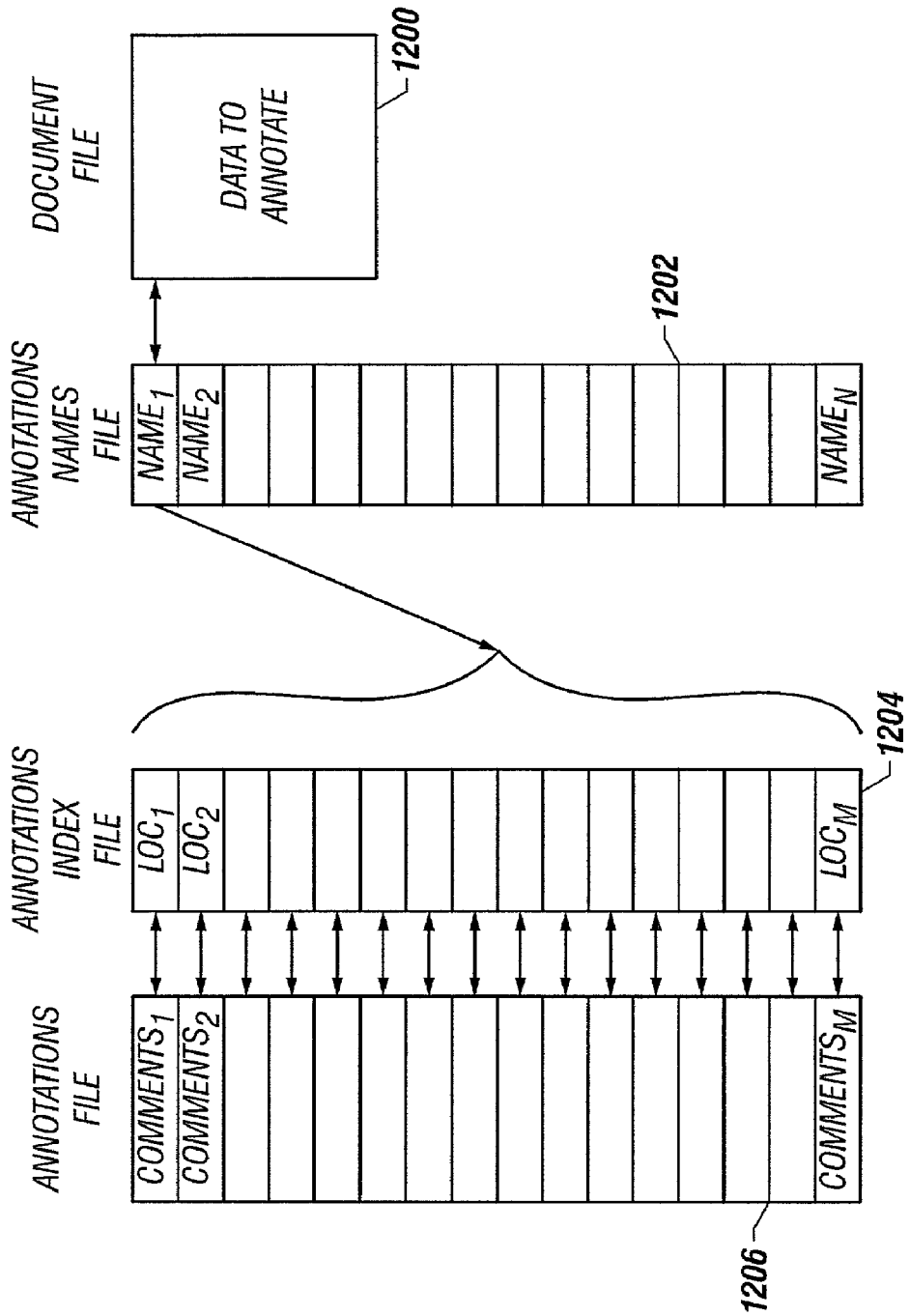
FIG. 12 shows a file structure for storing the annotations in accordance with an embodiment of the present invention.

In one or more embodiments, there are four basic files associated with the annotation of a document as shown in FIG. 12. These files comprise the original document 1200 (i.e., the document to be annotated). The Annotations Names File 1202, the Annotations Index File 1204, and the Annotations File 1206.

Document File 1200 comprises the document to be annotated and is not typically modified during annotation. Document file 1200 can also represent a previous annotation (comment) to another document. For example, a user may want to add comments to another user's comments. By adding comments to previous comments, a hierarchy of files and links is created. For example, for each document being annotated a trio of associations files (e.g., the annotations names file, annotations index file, and annotations file) are created. The result is a hierarchical tree of files with a root at the original document as shown in FIG. 13.

Figure 13:
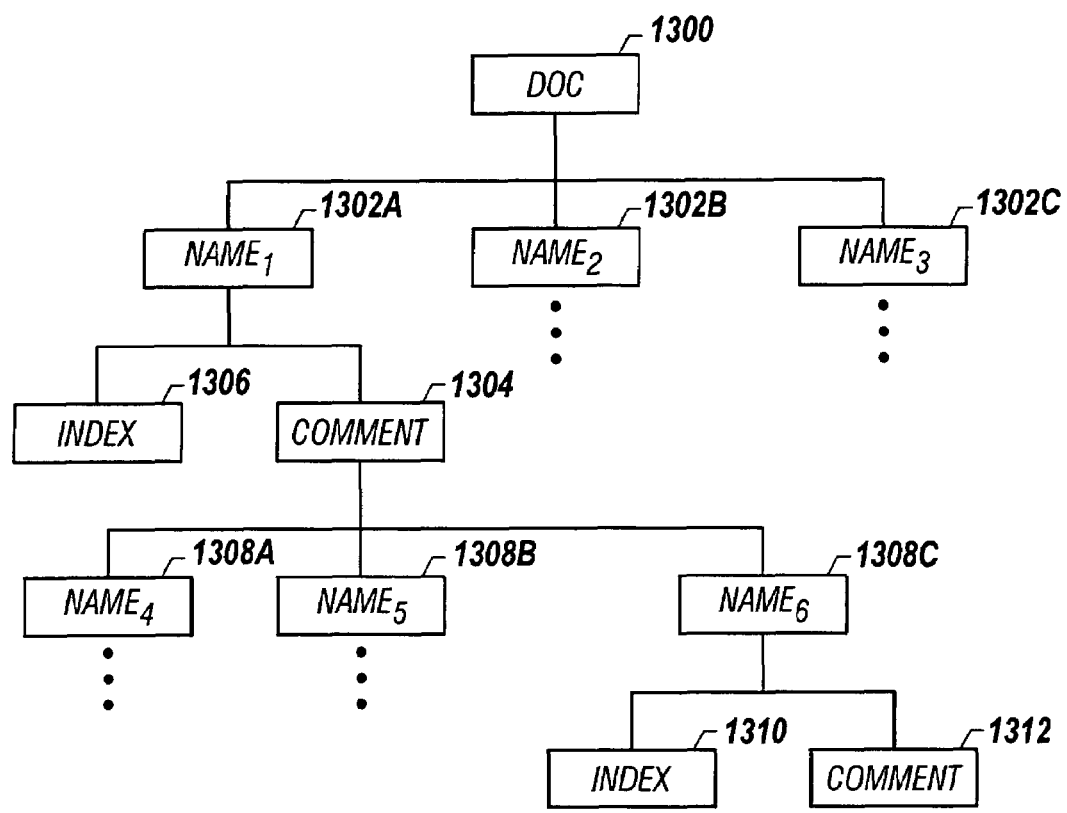
FIG. 13 is an illustration of the hierarchical tree structure of the file storage system in accordance with an embodiment of the present invention.

In FIG. 13, root node 1300 is the original document. The original document may be a book or a movie script, for example. As comments are added to the original document, the annotations names file represented as nodes 1302A-C, annotations index file node 1306, and annotations file node 1304 are created. In one or more embodiments, the comments contained in annotations file 1304 may be annotated thereby creating the children files represented in nodes 1308A-C, 1310, and 1312. Comment 1304 is an annotation by $NAME_1$ 1302A on the contents of document 1300 whereas comment 1312 is the annotation by $NAME_6$ 1308C on the comments made by $NAME_1$ 1302A on document 1300.

Comments 1304 represent a comment in annotations file 1206 for the first level of annotations of the original document. As structured, a second user may comment on any comment in annotations file 1206 made by a previous user. Therefore, it is possible to have a series of comment 1304 at the same level serving as intermediate nodes to additional comments.

Following the model discussed above, grandchildren and great-grandchildren nodes may be added to the hierarchical tree of annotations. The use of a hierarchical tree in this form makes it possible to add comments upon comments to any desired level, limited only by the memory capacity of the server, while still maintaining the ability to trace back to the original document. With this tree structure, it is possible to traverse the hierarchical tree to review selective comments using a sophisticated playback controller and annotating engine as described in this specification.

Referring back to FIG. 12, the annotations names file 1202 contains the identities of the users annotating the document. As discussed above, this document could be a previous comment (i.e. annotation) by another or the same user. In one or more embodiments, a series of alphanumeric characters may be employed for user identification. It is preferable to have unique identification for each user of the system however unique identification is not required. Using unique identifications make it easy to track sources of comments.

There is an annotations index file 1204 for each user (e.g., $NAME_1$) in the annotations names file 1202. For example, if there are "N" names in the annotations names file 1202, there will be "N" corresponding annotations index files 1204. Each location (e.g., $LOC_1$) in the annotations index file 1204 contains the location in document file 1200 where a comment is to be inserted, and the location of the comment in the annotations file 1206. That is, each location in the annotations index file 1204 contains two pieces of information. For each location in the annotations index file 1204, there is a location in annotations file 1206 comprising the corresponding user comment.

Using the file structure presented in FIG. 12 provides a method of infinitely storing and tracking the annotations (i.e. comments) made to an original document. Although the file structure described herein is desirable for ease of growth and traversal, however it would be obvious to those of ordinary skill that other file structures may be employed so long as it is conducive to retrieval of user annotations.

Figure 14:
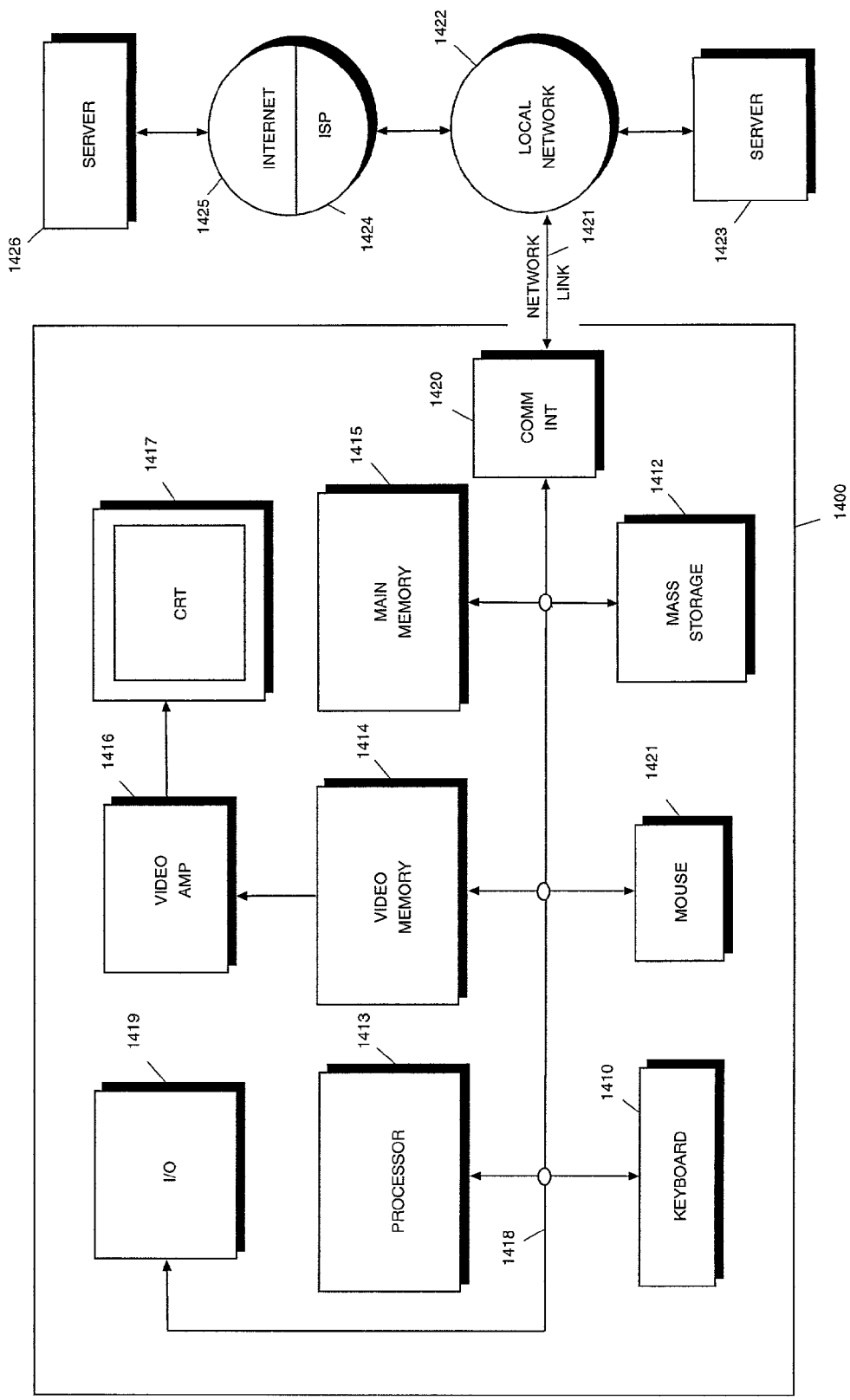
FIG. 14 shows a general-purpose hardware environment utilized to implement one or more embodiments of the invention.

Once the comments are stored in the file structure they may be reconstructed upon request by a user. A user may, for example, provide the annotated document to a secretary or some other person in order to finalize the document. In other instances the document is stored for later processing by another person. A description of a general-purpose computer environment that may be utilized to implement various portions of the invention follows:

Embodiment of General Purpose Computer Environment:

An embodiment of the invention can be implemented as computer software in the form of computer readable program code executed on one or more general-purpose computers such as the computer 1400 illustrated in FIG. 14. A keyboard 1410 and mouse 1411 are coupled to a bi-directional system bus 1418 (e.g., PCI, ISA or other similar architecture). The keyboard and mouse are for introducing user input to the computer system and communicating that user input to central processing unit (CPU) 1413. Other suitable input devices may be used in addition to, or in place of, the mouse 1411 and keyboard 1410. I/O (input/output) unit 1419 coupled to bi-directional system bus 1418 represents possible output devices such as a printer or an A/V (audio/video) device.

Computer 1400 includes video memory 1414, main memory 1415, mass storage 1412, and communication interface 1420. All these devices are coupled to a bi-directional system bus 1418 along with keyboard 1410, mouse 1411 and CPU 1413. The mass storage 1412 may include both fixed and removable media, such as magnetic, optical or magnetic optical storage systems or any other available mass storage technology. The system bus 1418 provides a means for addressing video memory 1414 or main memory 1415. The system bus 1418 also provides a mechanism for the CPU to transferring data between and among the components, such as main memory 1415, video memory 1414 and mass storage 1412.

In one embodiment of the invention, the CPU 1413 is a microprocessor manufactured by Motorola, such as the 680X0 processor, an Intel Pentium III processor, or an UltraSparc processor from Sun Microsystems. However, any other suitable processor or computer may be utilized. Video memory 1414 is a dual ported video random access memory. One port of the video memory 1414 is coupled to video accelerator 1416. The video accelerator device 1416 is used to drive a CRT (cathode ray tube), and LCD (Liquid Crystal Display), or TFT (Thin-Film Transistor) monitor 1417. The video accelerator 1416 is well known in the art and may be implemented by any suitable apparatus. This circuitry converts pixel data stored in video memory 1414 to a signal suitable for use by monitor 1417. The monitor 1417 is a type of monitor suitable for displaying graphic images.

The computer 1400 may also include a communication interface 1420 coupled to the system bus 1418. The communication interface 1420 provides a two-way data communication coupling via a network link 1421 to a network 1422. For example, if the communication interface 1420 is a modem, the communication interface 1420 provides a data communication connection to a corresponding type of telephone line, which comprises part of a network link 1421. If the communication interface 1420 is a Network Interface Card (NIC), communication interface 1420 provides a data communication connection via a network link 1421 to a compatible network. Physical network links can include Ethernet, wireless, fiber optic, and cable television type links. In any such implementation, communication interface 1420 sends and receives electrical, electromagnetic or optical signals which carry digital data streams representing various types of information.

The network link 1421 typically provides data communication through one or more networks to other data devices. For example, network link 1421 may provide a connection through local network 1422 to a host computer 1423 or to data equipment operated by an Internet Service Provider (ISP) 1424. ISP 1424 in turn provides data communication services through the worldwide packet data communication network now commonly referred to as the "Internet" 1425. Local network 1422 and Internet 1425 both use electrical, electromagnetic or optical signals that carry digital data streams to files. The signals through the various networks and the signals on network link 1421 and through communication interface 1420, which carry the digital data to and from computer 1400, are exemplary forms of carrier waves for transporting the digital information.

The computer 1400 can send messages and receive data, including program code, through the network(s), network link 1421, and communication interface 1420. In the Internet example, server 1426 might transmit a requested code for an application program through Internet 1425, ISP 1424, local network 1422 and communication interface 1420.

In one embodiment of the invention a thin-client device is configured to interface with the computer system described above via a computer network. In other instances (e.g., when a smart mobile device is utilized) some or all of the components discussed above are incorporated into the device. It will be evident to one of ordinary skill in the art that the computer systems described above are for purposes of example only. An embodiment of the invention may be implemented in any type of computer system or programming or processing environment.

Thus, a method and apparatus for annotating a document has been described. Particular embodiments described herein are illustrative only and should not limit the present invention thereby. The claims and their full scope of equivalents define the invention.

What is claimed is:

1. An apparatus for annotating a document comprising:
   a mobile apparatus;
   data storage coupled to said mobile apparatus, said data storage configured to store a text document and a plurality of audio comments, each of said stored plurality of audio comments annotating said text document and being linked to said text document;
   a document processing engine coupled to said mobile apparatus, said document processing engine configured to obtain an audio content conversion of said stored text document and at least a subset of said stored plurality of audio comments for playback as an audio source; and
   an annotator coupled to said mobile apparatus;
   said mobile apparatus comprising:
      an audio playback interface configured to receive at least one command for controlling playback of said audio source from a user;
      an audio input interface configured to obtain at least one new audio comment from said user at a point in said playback specified by said user,
   said annotator being configured to cause said new audio comment to be saved via said data storage as an annotation linked to a location in said text document based on said point in said playback specified by said user,
   wherein each of said plurality of audio comments annotating said text document is stored via a file structure comprising an annotations names file, said annotations names file comprising an entry for each user annotating said text document, wherein for each user identified in said annotations names file said file structure further comprises an annotations index file and an annotations file, and wherein said annotations file comprises at least one entry for a comment annotating said text document by said identified user and said annotations index file relates a location in said text document to said comment by said identified user.

2. The apparatus of claim 1, wherein said data storage comprises removable media.

3. The apparatus of claim 2, wherein said removable media comprises flash memory.

4. The apparatus of claim 1, wherein said audio source comprises a streaming media file.

5. The apparatus of claim 1, wherein said annotations names file corresponding to said text document includes an entry identifying said mobile apparatus user.

6. The apparatus of claim 1, wherein another audio comment obtained from said user annotates one of said plurality of audio comments, said file structure further comprising an annotations names file associated with said annotated comment, wherein said annotated comment's annotations names file has an associated annotations index file and an associated annotations file, and wherein said associated annotations index file relates a location in said annotated comment to said other audio comment.

7. The apparatus of claim 6, wherein said file structure comprises a hierarchical tree structure which comprises:
   a document file corresponding to said text document at a top level;
   said annotations names file corresponding to said document file at a second level below said top level;
   said annotations index file and said annotations file corresponding to said annotations names file at a third level below said second level,
   wherein said third level is followed by some number of sub-levels, each sub-level corresponding to a comment and comprising a top level comprising an annotations names file identifying a name of at least one user annotating said comment, and an annotations index file and an annotations file associated with said comment-associated annotations names file.

8. The apparatus of claim 1, wherein each audio comment of said plurality of audio comments has a corresponding name of a user providing said audio comment, and said mobile apparatus user identifies one or more commenting users whose comments said mobile apparatus user wishes to be played back while the said mobile apparatus user is experiencing the audio source.

9. The apparatus of claim 1, wherein said mobile apparatus is a smart mobile apparatus comprising said data storage, document processing engine and annotator.

10. The apparatus of claim 9, wherein said smart mobile apparatus is a smart telephone.

11. The apparatus of claim 9, wherein said smart mobile apparatus is coupled to a computing device, and wherein said computing device comprising one or more of said data storage, document processing engine and annotator.

12. The apparatus of claim 1, wherein said mobile apparatus is a telephone coupled to at least one computing device comprising said data storage, document processing engine and annotator.

13. The apparatus of claim 1, wherein said mobile apparatus is coupled to at least one computing device comprising some or all of said data storage, document processing engine and annotator.

14. The apparatus of claim 1, wherein said mobile apparatus comprises one or more of said data storage, document processing engine and annotator.

* * * * *